US009886626B1

(12) United States Patent
Stout et al.

(10) Patent No.: US 9,886,626 B1
(45) Date of Patent: Feb. 6, 2018

(54) DIGITIZED HANDWRITING SAMPLE INGESTION AND GENERATION SYSTEMS AND METHODS

(71) Applicant: GRACIOUS ELOISE, INC., New York, NY (US)

(72) Inventors: Hugh Stout, New York, NY (US); R. Ford Hurley, New York, NY (US); Grover S. Ehlers, Casco, WI (US)

(73) Assignee: GRACIOUS ELOISE, INC., New York, NY (US)

( * ) Notice: Subject to any disclaimer, the term of this patent is extended or adjusted under 35 U.S.C. 154(b) by 0 days.

(21) Appl. No.: 15/349,963

(22) Filed: Nov. 11, 2016

Related U.S. Application Data

(63) Continuation-in-part of application No. 15/273,610, filed on Sep. 22, 2016.

(51) Int. Cl.
*G06K 9/00* (2006.01)
*G06K 15/00* (2006.01)
(Continued)

(52) U.S. Cl.
CPC ......... *G06K 9/00436* (2013.01); *G06F 3/041* (2013.01); *G06F 3/048* (2013.01);
(Continued)

(58) Field of Classification Search
CPC ........... G06K 9/00154; G06K 9/00161; G06K 9/00167; G06K 9/00174; G06K 9/00187; G06K 9/00194; G06K 9/00402; G06K 9/00409; G06K 9/00416; G06K 9/00436; G06K 9/00852; G06K 9/00859; G06K 9/00865; G06K 9/18; G06K 9/222; G06K 15/00; G06K 15/02; G06K 2215/00; G06F 3/018; G06F 3/0346; G06F 3/03545;
(Continued)

(56) References Cited

U.S. PATENT DOCUMENTS 5,108,206 A * 4/1992 Yoshida ................. G06K 15/02
 345/471
5,327,342 A * 7/1994 Roy ....................... G06F 17/211
 382/209

(Continued)

OTHER PUBLICATIONS

U.S. Appl. No. 15/273,610, Gracious Eloise, Inc.

*Primary Examiner* — Eric Rush
(74) *Attorney, Agent, or Firm* — Aeon Law, PLLC; Adam L.K. Philipp; Jonathan E. Olson

(57) ABSTRACT

Certain aspects of the present methods and systems may focus on computer implemented methods of obtaining digitized hand-writing data corresponding to a sample of a needed code point of a set of code points. Such methods may include: obtaining a sample of digitized handwritten text, the sample of digitized handwritten text including glyph data corresponding to a first glyph, the first glyph corresponding to the needed code point of the set of code points; associating the first glyph with the needed code point; identifying stroke data in the glyph data, the stroke data corresponding to a stroke component of the first glyph, determining a plurality of dimensional values of the stroke component in the stroke data; and associating the plurality of dimensional values with a new code point sample of the needed code point in a code point set data structure.

12 Claims, 32 Drawing Sheets

(51) Int. Cl.
*G06F 3/041* (2006.01)
*G06K 9/22* (2006.01)
*G06F 3/048* (2013.01)
*G06F 3/0488* (2013.01)

(52) U.S. Cl.
CPC ..... *G06F 3/04883* (2013.01); *G06K 9/00174* (2013.01); *G06K 9/00187* (2013.01); *G06K 9/00194* (2013.01); *G06K 9/00416* (2013.01); *G06K 9/222* (2013.01); *G06K 15/00* (2013.01); *G06K 2215/00* (2013.01)

(58) Field of Classification Search
CPC ........ G06F 3/041; G06F 3/048; G06F 3/0488; G06F 3/04883
USPC ........ 382/100, 186–189, 198, 200, 309, 311, 382/321, 325
See application file for complete search history.

(56) References Cited

U.S. PATENT DOCUMENTS

| | | | |
|---|---|---|---|
| 5,412,771 A * | 5/1995 | Fenwick | G06F 17/214 382/266 |
| 6,256,410 B1 | 7/2001 | Nathan et al. | |
| 7,352,899 B2 * | 4/2008 | Loeb | G06F 17/214 382/186 |
| 7,483,570 B1 * | 1/2009 | Knight | G06F 17/214 382/186 |
| 7,697,001 B2 | 4/2010 | Lin | |
| 8,103,100 B2 * | 1/2012 | Jang | G06K 9/46 382/187 |
| 8,121,338 B2 * | 2/2012 | Clermont | G06T 11/60 382/100 |
| 8,351,700 B2 | 1/2013 | D'Agostino et al. | |
| 8,699,794 B2 | 4/2014 | D'Agostino et al. | |
| 8,749,800 B2 * | 6/2014 | Rimai | G06F 17/214 382/185 |
| 9,230,514 B1 * | 1/2016 | Bacus | G09G 5/24 |
| 2004/0091176 A1 * | 5/2004 | Bai | G06F 17/2217 382/305 |
| 2004/0148577 A1 * | 7/2004 | Xu | G06F 3/04883 715/268 |
| 2004/0223645 A1 * | 11/2004 | Cliff | G06F 17/214 382/186 |
| 2009/0041354 A1 * | 2/2009 | Liu | G06K 9/6297 382/187 |
| 2012/0001922 A1 * | 1/2012 | Escher | G06F 17/214 345/467 |
| 2013/0106865 A1 * | 5/2013 | Eibye | G06K 9/00416 345/467 |
| 2014/0363082 A1 * | 12/2014 | Dixon | G06K 9/00402 382/187 |
| 2016/0210505 A1 * | 7/2016 | Chiu | G06K 9/00187 |
| 2016/0328620 A1 | 11/2016 | Elarian | |

* cited by examiner

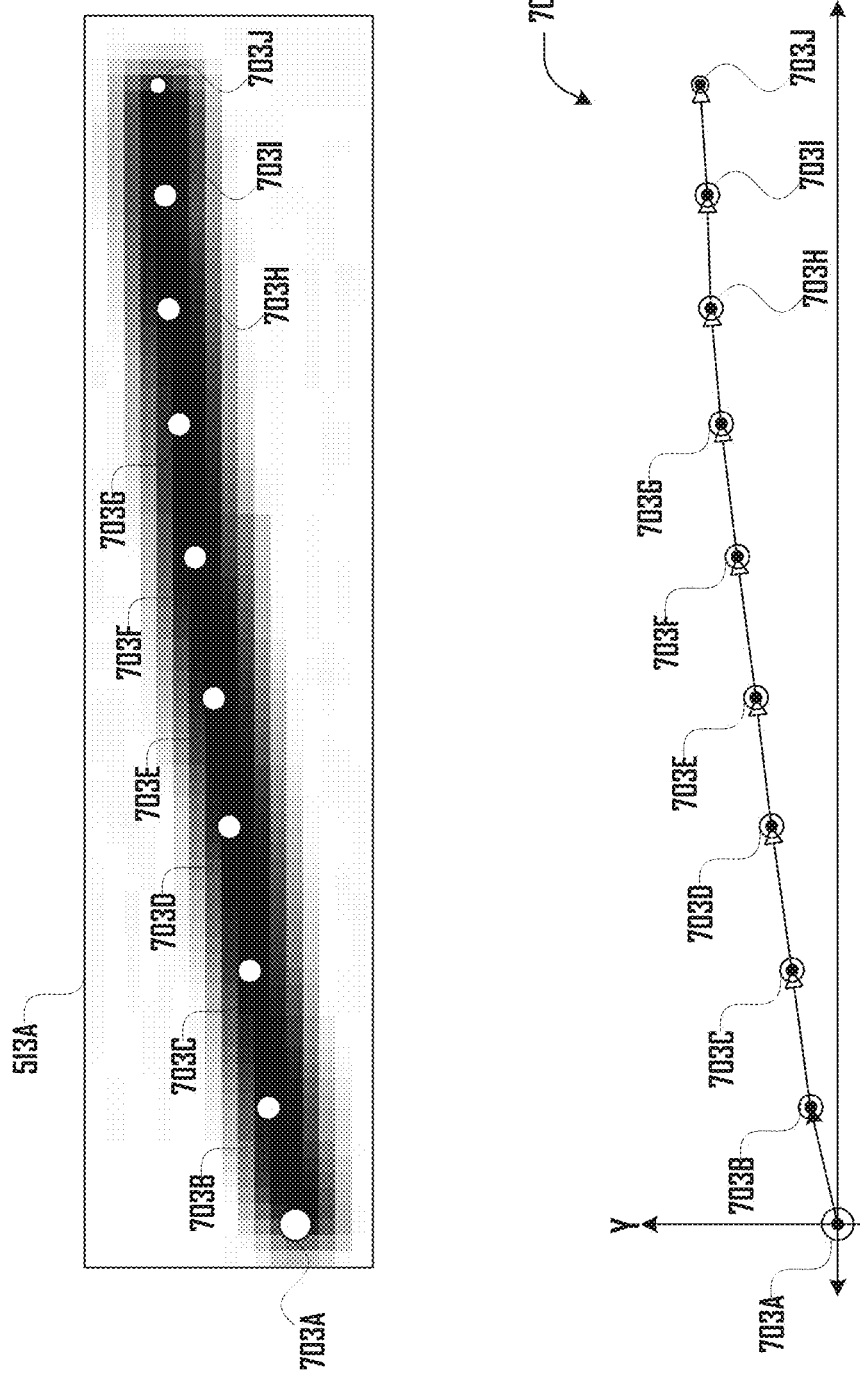

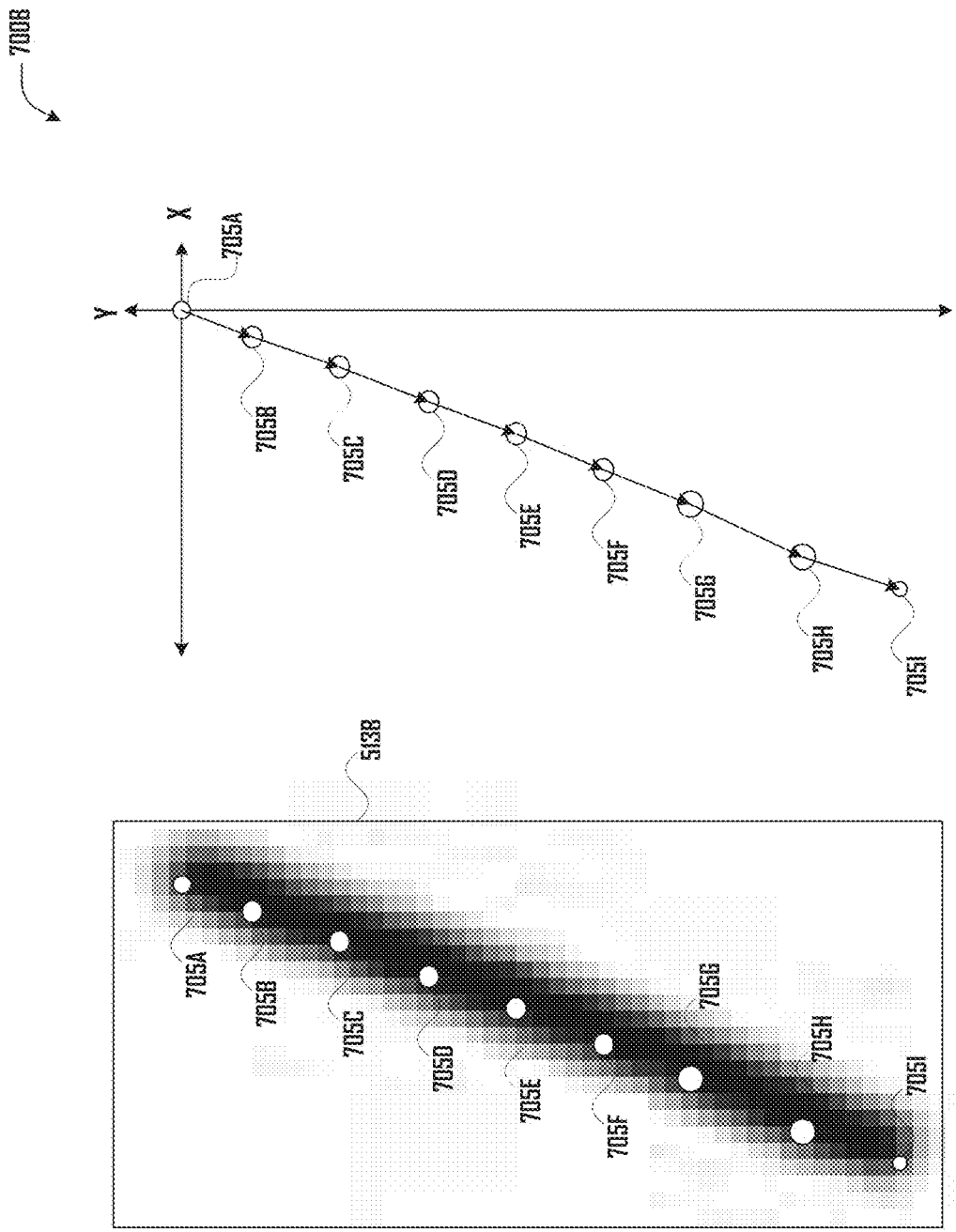

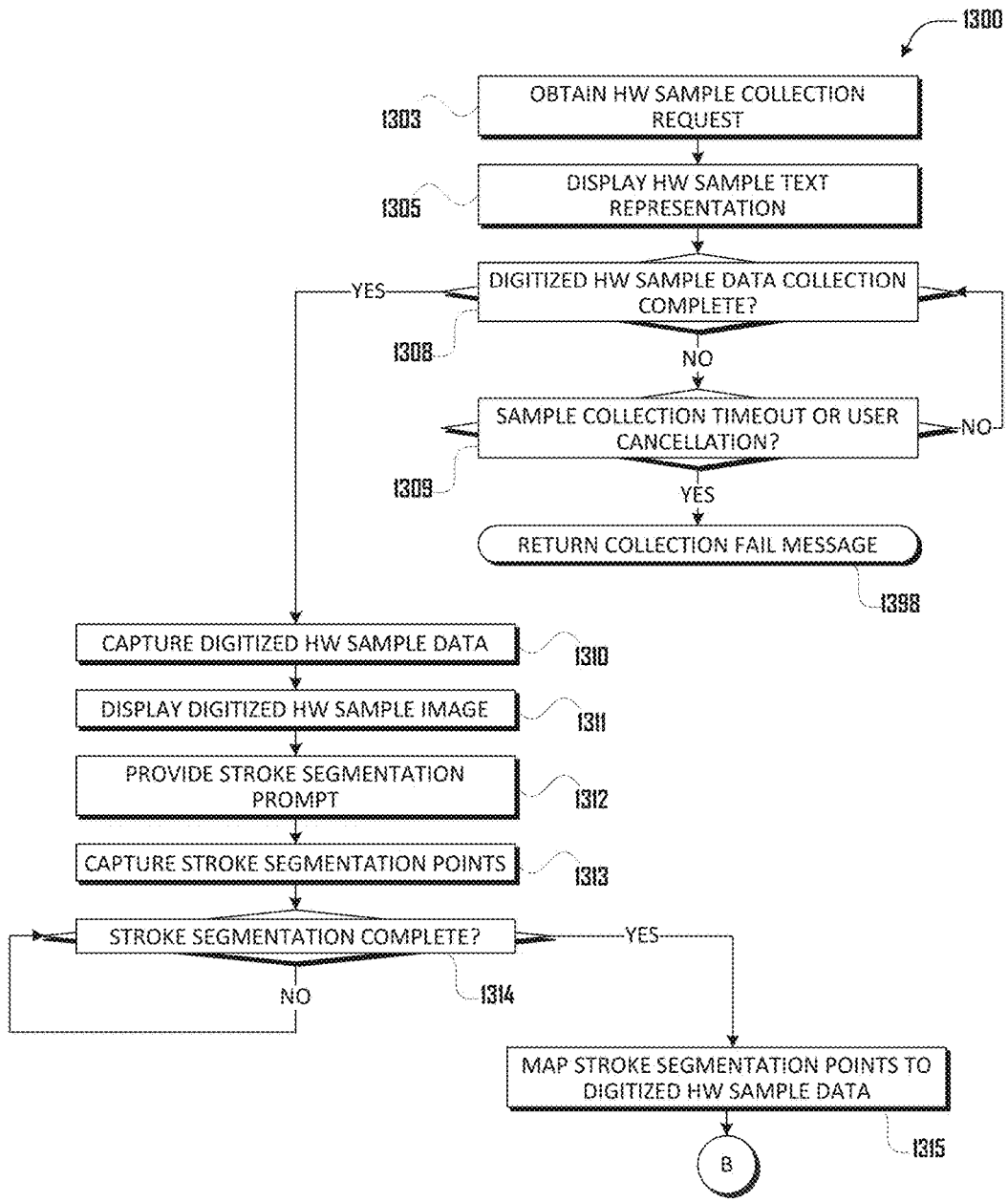

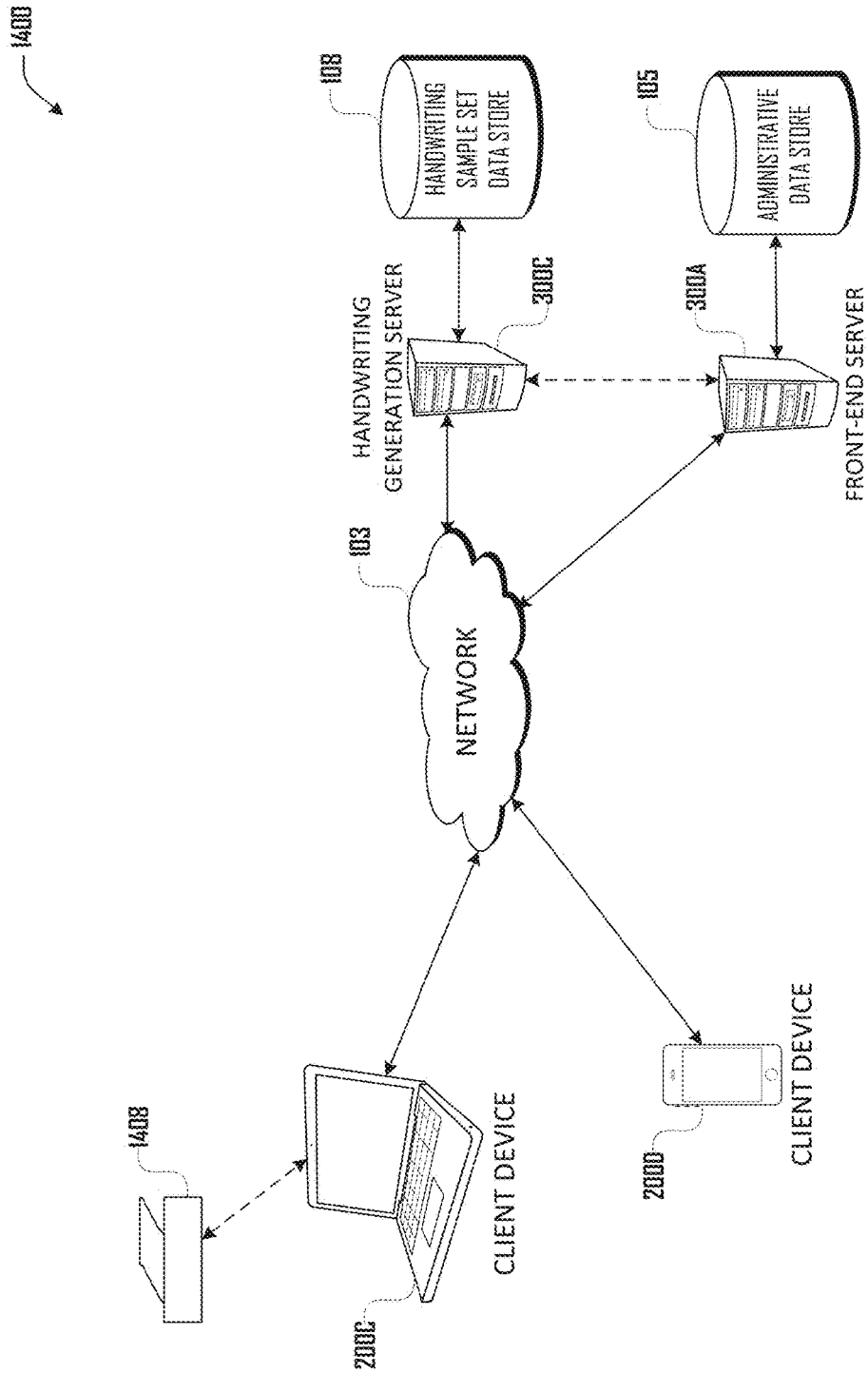

DIGITIZED HANDWRITING SAMPLE INGESTION AND GENERATION SYSTEMS AND METHODS

FIELD

The present disclosure relates to computer handwriting analysis and synthesis, and more particularly, to systems and methods for digitized handwriting data collection and analysis.

BACKGROUND

Since the advent of desktop publishing in the mid-1980s, it has become increasingly easy to use commonly-available software to create and print letters, cards, documents, and other printed matter. Moreover, at the present time, a computer user may have scores or even hundreds of high-quality fonts installed on his or her computer, with thousands of additional free and commercial fonts available via the Internet. As a result, many people have become accustomed to receiving printed materials that are not hand-written. Indeed, hand-written notes and cards may signal to a recipient a sense of importance and particular care because the sender personally took the effort to hand-craft the message.

There are numerous fonts that are intended to mimic generic handwriting to a certain extent. There are even services that will create a font to mimic a particular person's handwriting. However, existing personalized-handwriting fonts may appear mechanical and/or unnatural because individual glyphs may always be printed with identical geometry, whereas in an actual hand-written document, each individual character may have its own subtly unique geometry. Moreover, existing personalized-handwriting fonts and personalized-handwriting-font-creation services may have difficulty isolating individual glyph within a sample of cursive handwriting or other handwriting in which adjacent letters may be connected to one another.

Other techniques may use a variable glyph representation to mimic an individual's handwriting, such as the systems and methods described in U.S. Pat. Nos. 8,351,700 and 8,699,794.

BRIEF DESCRIPTION OF THE DRAWINGS

FIGS. 7A-B illustrate a visual illustration of stroke dimensional data obtained by various aspects of the client/server-based handwriting ingestion system in accordance with various embodiments.

FIGS. 13A-B illustrate a functional block diagram of a handwriting sample collection sub-routine which may be implemented by a client device of the client/server-based handwriting ingestion system in accordance with various embodiments.

FIG. 14 illustrates an exemplary network topology of a client/server-based handwriting generation system in accordance with various embodiments.

DESCRIPTION

Figure 1:
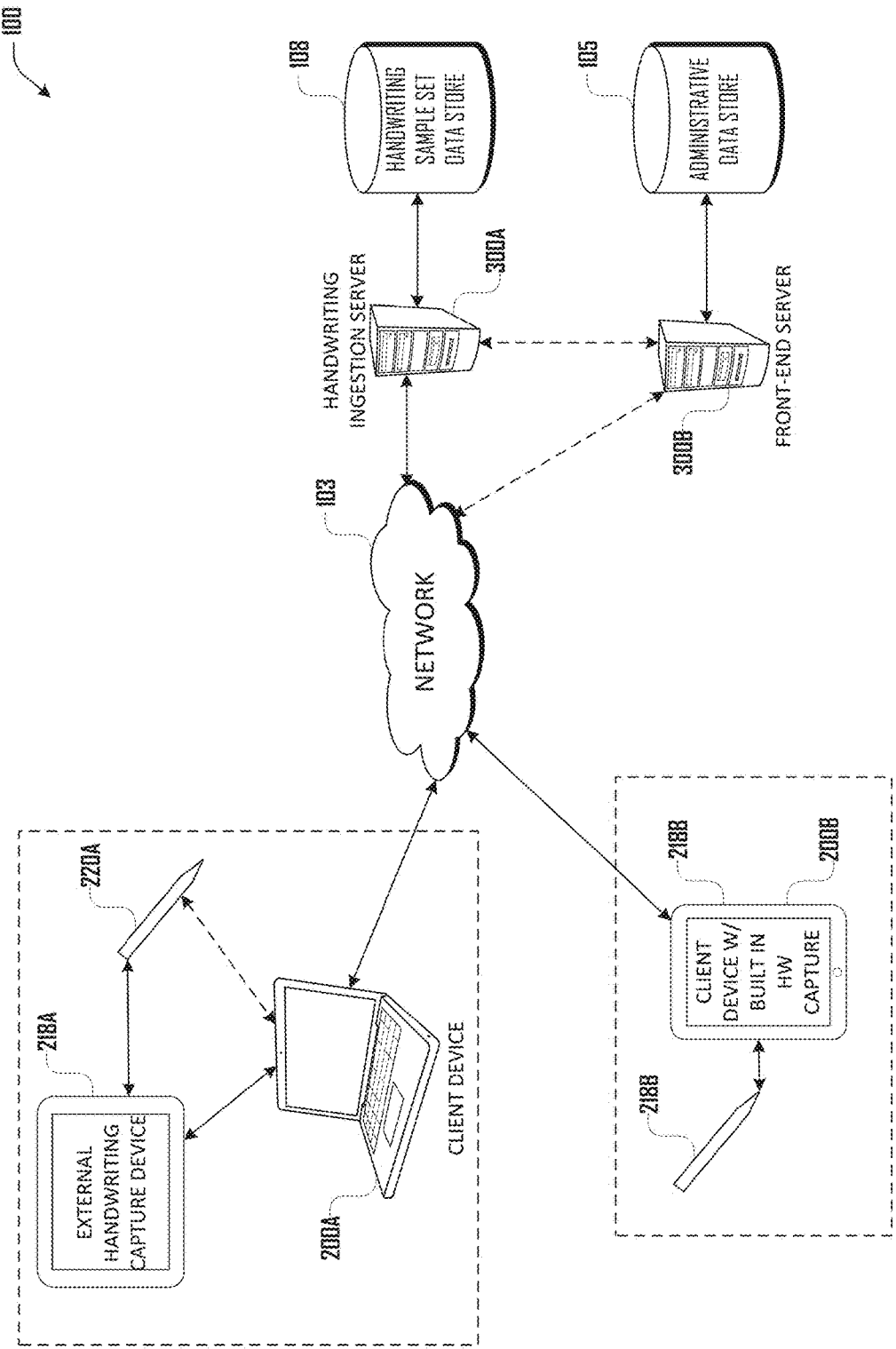
FIG. 1 illustrates an exemplary network topology of a client/server-based handwriting ingestion system in accordance with various embodiments.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers, and/or memory storage devices. Each of these conventional distributed computing components is accessible by the processor via a communication network, which may include, but is not limited to, the Internet.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein. For example, the embodiments set forth below are primarily described in the context of obtaining data corresponding to digitized samples of handwritten text in the English language via a digitizing surface device and a digitizing marking device. However, these embodiments are exemplary and are in no way limited to the type of item for which recommendations are being generated.

Exemplary Network Topology of a Client/Server-Based Handwriting Ingestion System FIG. 1 illustrates a first exemplary client/server-based handwriting ingestion system 100 in accordance with various embodiments. Client devices 200A-B and a remote front-end server 300A are in data communication with a network 103. In various embodiments, network 103 may include the Internet, one or more local area networks ("LANs"), one or more wide area networks ("WANs"), cellular data networks, and/or other data networks. Network 103 may, at various points, be a wired and/or wireless network. Remote front-end server 300A may be in data communication with a remote handwriting ingestion server 300B and an administrative data store 105. Remote handwriting ingestion server 300B may be in data communication with a handwriting sample set data store 108.

In these and other embodiments, client devices 200, such as client device 200A and client device 200B, may be networked computing devices having form factors including general purpose computers (including "desktop," "laptop," "notebook," "tablet" computers, or the like); mobile phones; watches, glasses, or other wearable computing devices; or the like. For simplified exemplary purposes, two client devices are shown, one of which is depicted as a laptop computer and the other of which is depicted as a tablet computer. In various embodiments there may be many more client devices 200. The primary functional components of an exemplary, form-factor-independent client device 200 are described below in reference to FIG. 2.

Client device 200A may be in data communication with an external digitizing surface device 218A and a digitizing marking device (e.g. a "stylus") 220A. Digitizing marking device 220A may be in data communication with client device 200A via external digitizing surface device 218A or may be in direct data communication with the client device (as indicated by dotted lines).

Client device 200B includes a built in digitizing surface device 218B and may be in data communication with a digitizing marking device 220B.

In various embodiments, remote front-end server 300A and remote handwriting ingestion server 300B may be networked computing devices generally capable of accepting requests over network 108, e.g. from client devices 200, each other, various databases, and/or other networked computing devices, such as a remote handwriting generation server (not shown), and providing responses accordingly. The primary functional components of an exemplary remote server 300, such as remote front-end server 300A and remote handwriting ingestion server 300B, are described below in reference to FIG. 3.

Exemplary Client Device

Figure 2:
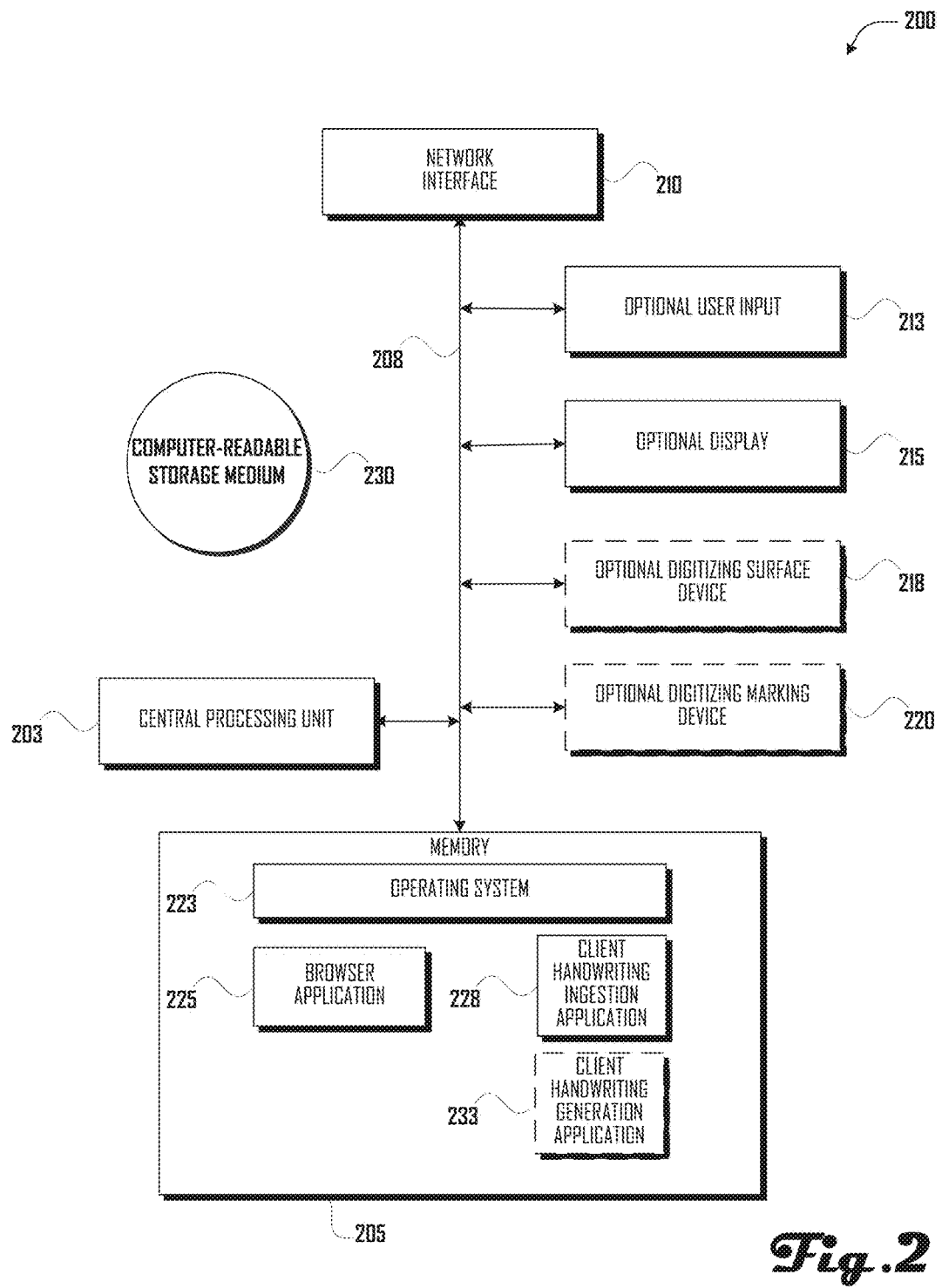
FIG. 2 illustrates a functional block diagram of an exemplary client computing device, suitable for use with the client/server-based handwriting ingestion system in accordance with various embodiments.

FIG. 2 illustrates several components of an exemplary client device 200, such as any of client devices 200A-B, is illustrated. In some embodiments, a client device 200 may include many more components than those shown in FIG. 2. However, it is not necessary that all of these generally conventional components be shown in order to disclose an illustrative embodiment. The data communications between various components of client device 200 may be accomplished by wired and/or wireless connections As shown in FIG. 2, exemplary client device 200 includes a central processing unit 203 in data communication with memory 205 via a bus 208. Central processing unit 203 is an electronic circuit designed to carry out instructions of a computer program, e.g. obtained from memory 205, by performing the basic arithmetic, logical, control and input/output (I/O) operations specified by the program's instructions. Memory 205 generally comprises some or all of random access memory (RAM), read-only memory (ROM), and/or a permanent mass storage device, such as a disk drive, flash memory, or the like. Bus 208 is a communication system that transfers data between components within client device 200, and encompasses any related hardware components (wire, optical fiber, etc.) and software, including communication protocols.

Client device 200 may also include a network interface 210 for connecting to a network such as network 103, one or more optional user input device(s) 213, e.g. an alphanumeric keyboard, keypad, a mouse or other pointing device, a touchscreen, and/or a microphone, (or a user input port for connecting an external user input device), an optional digitizing surface device 215, such as digitizing surface device 215B, (or a port for connecting an external digitizing surface device, such as digitizing surface device 215A), an optional digitizing marking device (or a port for connecting to an external digitizing marking device, such as digitizing marking devices 218A-B), and the like, all interconnected, along with the network interface 210, to central processing unit 203 and memory 205 via bus 208.

Memory 205 of exemplary client device 200 may store program code, executable by central processing unit 203, corresponding to an operating system 223, as well as program code corresponding to various software applications, such as a browser application 225, a handwriting ingestion application 228, and other software applications (not shown). Operating system 223 and such various software applications may be loaded into memory 205 via network interface 210 or via a computer readable storage medium 230, such as a hard-disk drive, a solid-state drive, an optical disc, a removable memory card, and/or the like.

Browser application 225 is a software application for retrieving, presenting, and traversing information resources on a network, such as network 108. Although browser application 225 may be primarily intended to use the World Wide Web, it may also be used to access information resources provided by remote servers in private networks. An information resource may be a web page, an image, a video, or other piece of content and may be identified by a Uniform Resource Identifier (URI/URL) on network 108. An information resource may also provide browser application 225 executable program code for web applications, i.e. a software application that runs in and is rendered by browser application 225.

In operation, operating system 223 manages the hardware and software resources of client device 200 and provides common services and memory allocation for various software applications, such as research study data acquisition and quality control application 228. For hardware functions such as network communications via network interface 210, receiving data via input 213, outputting data via optional display 215, and allocation of memory 205 for various software applications, such as handwriting ingestion application 228, operating system 223 acts as an intermediary between software executing on the client device and the device's hardware.

For example, operating system 223 may cause a representation of available software applications, such as browser application 225 and handwriting ingestion 228, to be presented to a user of client device 200 via display 215. If client device 200 obtains an indication from a user, e.g. via user input 213, a desire to use handwriting ingestion application 228, operating system 223 may instantiate a handwriting ingestion application process (not shown), i.e. cause central processing unit 203 to begin executing the executable instructions of the handwriting ingestion application and allocate a portion of memory 205 for its use.

In the case of a web application, browser application 225 may act as an intermediary between a software service operating on a remote server and the operating system 223. For example, a software service equivalent of handwriting ingestion application 228 may be executing on front-end server 400A.

Although an exemplary client device 200 has been described with hardware components that generally conforms to conventional general purpose computing devices, a client device may be any of a great number of devices capable of communicating with network 103 and executing instructions for performing handwriting ingestion application 228.

Exemplary Server

Figure 3:
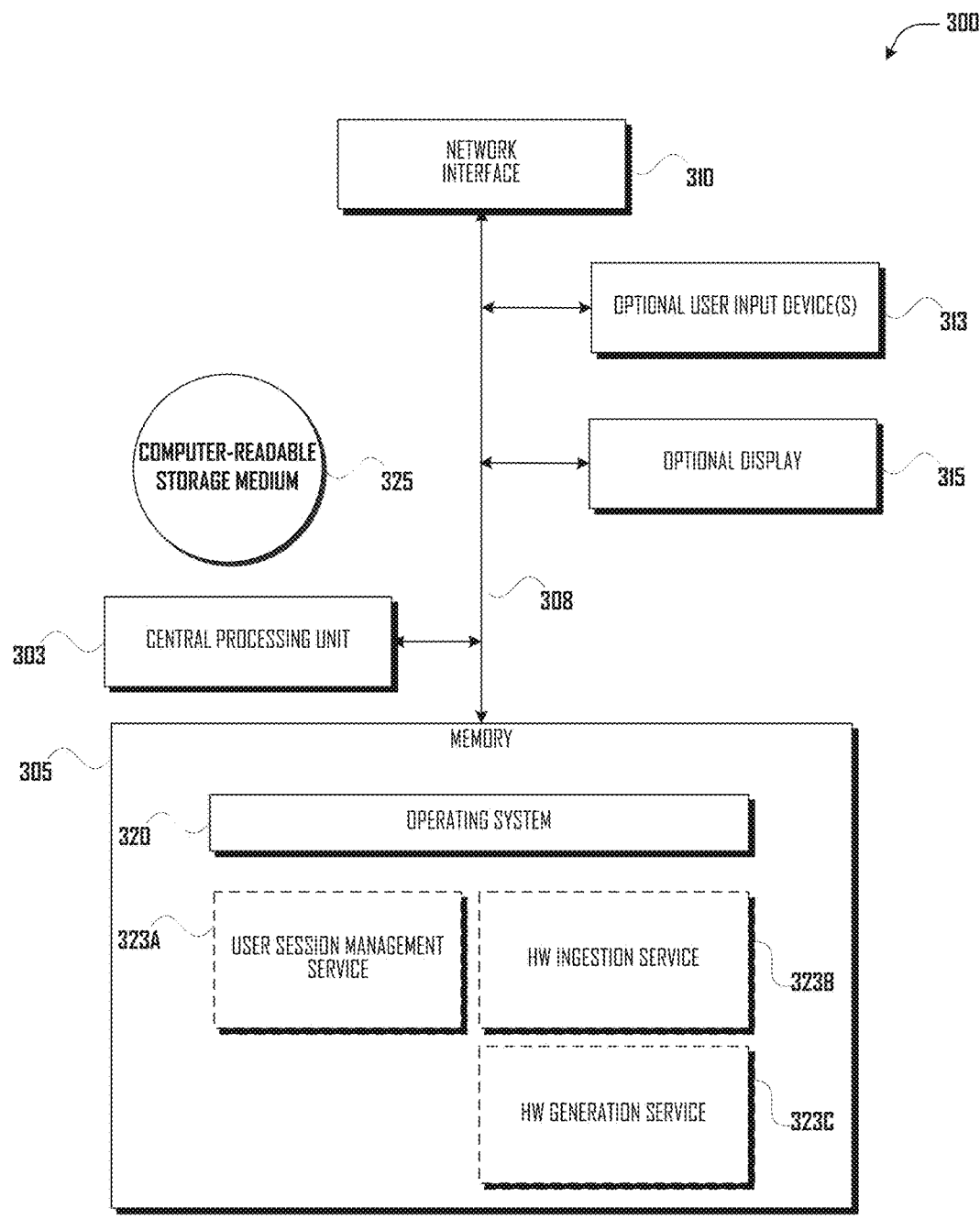
FIG. 3 illustrates a functional block diagram of an exemplary server computing device, suitable for use with the client/server-based handwriting ingestion system in accordance with various embodiments.

FIG. 3 illustrates several components of an exemplary server 300, such as front-end server 300A and handwriting ingestion server 300B, in accordance with at least one exemplary embodiment are illustrated. In some embodiments, a server 300 may include many more components than those shown in FIG. 3. However, it is not necessary that all of these generally conventional components be shown in order to disclose an illustrative embodiment. As shown in FIG. 3, a server 300 includes a central processing unit 303 and memory 305 connected by a bus 308.

Central processing unit 303 is an electronic circuit designed to carry out instructions of a computer program, e.g. obtained from memory 305, by performing the basic arithmetic, logical, control and input/output (I/O) operations specified by the program's instructions. Memory 305 may generally include some or all of random access memory (RAM), read-only memory (ROM), and/or a permanent mass storage device, such as a disk drive, flash memory, or the like. Bus 308 is a communication system that transfers data between components within exemplary server 300, and includes any related hardware components (wire, optical fiber, etc.) and software, including communication protocols.

Server 300 may also include a network interface 310 for connecting to a network such as network 103, one or more optional user input device(s) 313, e.g. an alphanumeric keyboard, keypad, a mouse or other pointing device, a touchscreen, and/or a microphone, (or a user input port for connecting an external user input device) and/or an optional display 315 (or a display port for connecting an external display device), both interconnected along with the network interface 310 via bus 308.

Memory 305 may store an operating system 320 and program code for various software services 323. For example, front-end server 300A may include executable instructions for performing user session management service 323A (indicated by dotted lines) and handwriting ingestion server 300B may include executable instructions for performing handwriting ingestion service 323B (indicated by dotted lines).

Program code for these and other such software services, such as a software services (not shown) equivalent to handwriting ingestion application 228, may be loaded into memory 305 from a non-transient computer readable storage medium 325 using a drive mechanism (not shown) associated with the non-transient computer readable storage medium, such as, but not limited to, a DVD/CD-ROM drive, memory card, or the like. Software components may also be loaded into memory 304 via the network interface 310. A server 300 may also communicate via bus 308 with a database (not shown), such as admin database 105 and/or trial data database 108, or other local or remote data store.

In operation, operating system 320 manages the hardware and software resources of server 300 and provides common services and memory allocation for various software services, such as user session management service 323A or handwriting ingestion service 323B. For hardware functions such as network communications via network interface 310 and allocation of memory 305 for various software services, such as handwriting ingestion service 323B, operating system 320 may act as an intermediary between software executing on server 300 and the server's hardware.

Although an exemplary server 300 has been described having hardware components that generally conform to a conventional general purpose computing device, a server may be any of a great number of devices capable of communicating with network 103 and executing instructions for performing user session management service 323A and/or handwriting ingestion service 323B.

In some embodiments, a server 300 may comprise one or more replicated and/or distributed physical or logical devices. In some embodiments, one or more of front-end server 300A and handwriting ingestion server 300B may be embodied by the same physical device.

Client/Server-Based Handwriting Ingestion Systems

Referring collectively to FIGS. 1-3, and as is described in more detail below, an instance of client handwriting ingestion application 228 operating on a client device, such as client devices 200A-B, remote user session management service 323A operating on front-end server 300A, and remote handwriting ingestion service 323B operating on handwriting ingestion server 300B (collectively a client/server-based handwriting ingestion system) in accordance with the present embodiments may operate to create a code-point sample data set of a user's handwriting comprehensive enough to allow the provider to obtain text data including a message from a user and generate an image, e.g. for electronic display and/or hard-copy printing, including a sequence of glyphs corresponding the message and having the appearance of being rendered in the user's handwriting. Such a client/server based handwriting ingestion system may be operated in furtherance of a handwriting digitization service provider (not shown) providing handwriting reproduction services.

Instantiations of client handwriting ingestion application 228 may act as an interface between a user of client device 200 and user session management service 323A operating on front-end server 300A. Upon instantiation, client handwriting ingestion application 228 may send a "create new session" request to user session management service 323A, for example including identifying information for client device 200, identifying information for the particular instantiation of client handwriting ingestion application 228, and/or user-account credentials such as a user name and password, obtained from the user or stored in memory 205. If presented, the user-account credentials may be associated with an existing user account or with a generic, temporary, and/or anonymous "guest" account.

User session management service 323A may create a corresponding user session (not shown) associated with the particular instantiation of client handwriting ingestion application 228, identified by a user-session identifier (referred to herein as a "session ID") and may obtain user account information, such as a user identifier, associated with the provided identifying information from administrative data store 105 and provide a response to client handwriting ingestion application 228, which may include information related to features and services provided by the handwriting digitization service provider which the user-account associated with the user-account credentials are authorized to access.

Client handwriting ingestion application 228 may then present the user with a menu of options, e.g. via optional display 215, and wait for the user to indicate a selection of a specific option, e.g. via optional input 213. Such options may include obtaining a new handwriting sample, viewing a measure of completeness of a handwriting sample set associated with the user identifier, creating a new handwriting sample set, and the like. Upon obtaining a selection of one of the presented options, e.g. via user input 213, client handwriting ingestion application 215 may process the selection and generate a request corresponding to the selected option.

These requests may be provided to user session management service 323A operating on front-end server 300A, e.g. via network 103. User session management service 323A may process the requests, provide related internal requests to handwriting ingestion service 323B, obtain responses from handwriting ingestion service 323B, provide responses to client handwriting ingestion application 228 and store records of these requests and responses and other related data, e.g. in administrative data store 105 indexed by a user identifier and/or a user session identifier.

When a user indicates a desire to create a new handwriting sample set, the handwriting ingestion system may identify a desired style of communication for a user, such as general English language communication, formal Japanese language communication, technical Arabic language communication, and the like. The handwriting ingestion system may then determine a code-point sub-set, applicable to the desired style of communication, from one or more universal code-point sets, such as the set of standard Unicode character code-points.

Figure 4:
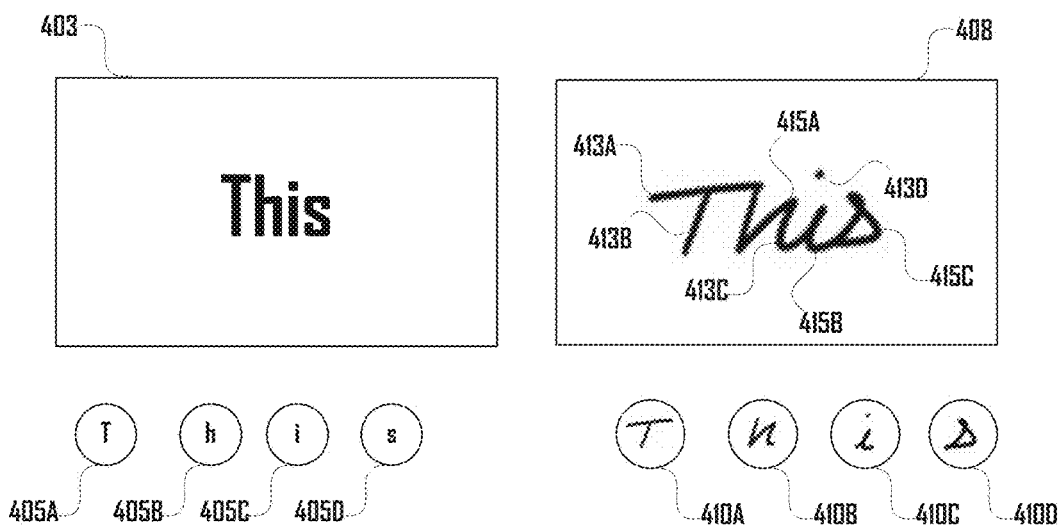
FIG. 4 illustrates a graphical representation of the relationship between character code-points, visual representations of the character code-points, handwritten glyph representations of the character code-points, and the stroke structure of such handwritten glyphs.

For each code-point within the applicable code-point sub-set, the handwriting ingestion system may collect one or more digitized samples of a handwritten glyphs corresponding to the code-point. For example, as is explained in more detail below, handwriting ingestion application 228 may provide a user interface that presents a user of client device 200 with a visual display of one or more code-points and instructs the user to write out glyphs corresponding to the one or more code-points using digitizing marking device 220 to make one or more strokes on digitizing surface device 218. Depending on the desired style of communication and the user's individual writing style, a digitized glyph sample may be made up of one or more strokes and multiple digitized glyph samples may also be contained within a single stroke. Therefore, handwriting ingestion application 228 may (1) accommodate glyph samples being made up of multiple, non-sequential strokes, for example if the digitizing marking device leaves the digitizing surface device during the glyph sample capture (as may be the case when hand writing the lower case English letters "f," "i," "j," "k," "t," and "x" for example) (2) provide a user with the opportunity to segment strokes into individual glyphs, and then provide the user with the opportunity to associate one or more strokes and/or one or more stroke segments with a code-point Referring to FIG. 4 by way of example, the word "This" 403 is made up of four sequential characters represented by four distinct code-points: a "T" code-point 405A, an "h" code-point 405B, an "i" code-point 405C, and a "s" code-point 405D; a corresponding digitized hand-written sample 408 of the word "This" may be made up of four sequential glyphs: a "T" glyph 410A, an "h" glyph 410B, an "i" glyph 410C, and an "s" glyph 410D. In this example, the digitized hand-written sample of the word "This" is made up of four strokes 413A-D, however strokes 413A-D do not respectively correspond to glyphs 410A-D. Rather, a 'horizontal' stroke 413A and 'vertical' stroke 413B together make up "T" glyph 410A; a third stroke 413C makes up "h" glyph 410B, "s" glyph 410D, and part of "i" glyph 410C. A 'dot' stroke 413D makes up the remainder of the "i" glyph 410C.

In accordance with various embodiments, after a user finishes 'dot' stroke 413D, the user may then selectively segment third stroke 413C into an "h" stroke segment 415A, an "i" stroke segment 415B, and an "s" stroke segment 415C. The user may then associate 'horizontal' stroke 413A and 'vertical' stroke 413B as a digitized glyph sample for "T" code-point 405A, "h" stroke segment 415A as a digitized glyph sample for "h" code-point 405B, "i" stroke segment 415B and 'dot' stroke 413D as a digitized glyph sample for "i" code-point 405B, and "s" stroke segment 415C as a digitized glyph sample for "s" code-point 405D.

For each digitized glyph sample, the handwriting ingestion system may record code-point sample contextual data related to the digitized glyph sample. For example, the handwriting ingestion system may record where the digitized glyph sample was collected within the context of a group of glyphs (e.g. at the beginning, or in the middle of a sequence of glyphs written as a continuous stroke), whether the previous glyph, if any, had an upward or downward exit angle (described in more detail below) and a low or high exit point, and whether the subsequent glyph, if any, had an upward or downward entry angle and a low or high entry point, and the like.

For each stroke and/or stroke segment making up the digitized glyph sample, the handwriting ingestion system may also record stroke dimension data. For example, for each stroke, the handwriting ingestion system may obtain and record data values relating to the stroke overall temporal duration; the stroke's relative horizontal displacement over time, the stroke's relative vertical displacement over time, the stroke's relative rotational displacement over time, the stroke's relative angular displacement over time, and the stroke's downward pressure over time.

Each glyph sample may be added to a code-point sample data set associated with the user (e.g. via a user identifier). The handwriting ingestion system will continue to collect digitized glyph samples for a given code-point until the system determines it can reproduce a full range of glyph variations of the code-point.

Handwriting Ingestion User Interface

FIGS. 5A-K illustrate various states of an exemplary user interface 500 provided by handwriting ingestion application 228 operating on a client device 200 for enabling a user of the client device to selectively provide digitized samples of the user's handwriting via a digitizing surface device in conjunction with a digitizing marking device. Exemplary user interface 500 may, for example, be rendered by display 215 in response to the execution of instructions of an instantiation of client handwriting ingestion application 228 operating on a client device 200. Handwriting ingestion UI 500 may be rendered in a window 503 including an instructive prompt 505, a sample text display 508, and an input reproduction rendering display 510.

Figure 5A:
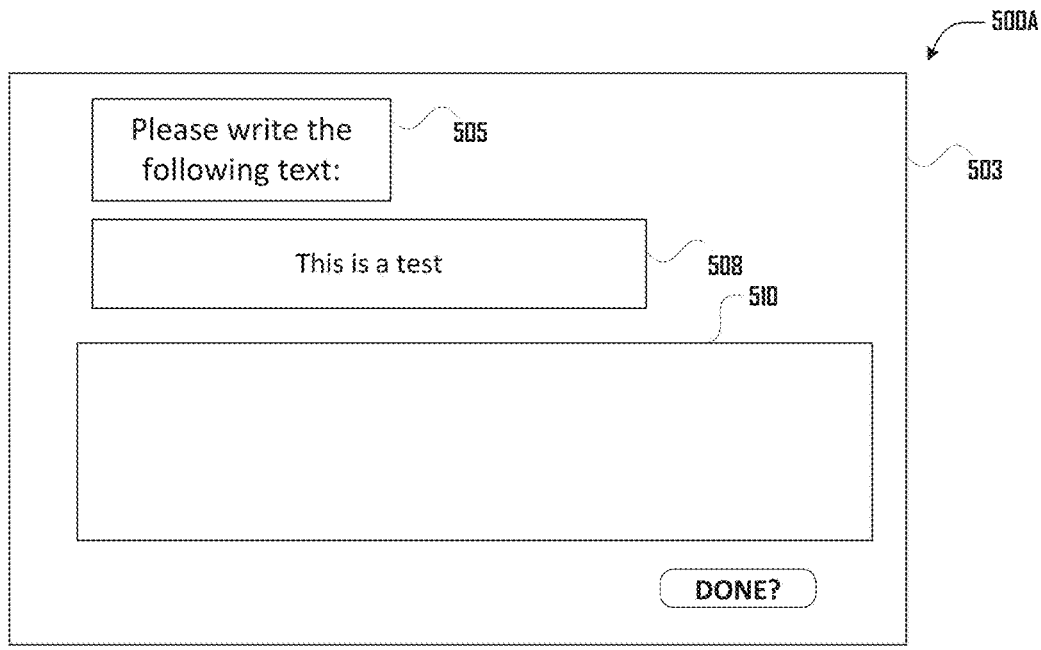
FIGS. 5A-K illustrate a general schematic diagram of an exemplary handwriting ingestion user interface suitable for use with the client/server-based handwriting ingestion system in accordance with various embodiments.

In FIG. 5A, handwriting ingestion UI 500 is illustrated in an initial prompt state 500A. In initial prompt state 500A, instructive prompt 505 displays text instructing a user operating client device 200 to input the sample text ("This is a test") displayed in sample text display 508 via digitizing surface device 218 and digitizing marking device 220. In the illustrated example, the displayed sample text includes: one instance of a "T" code-point; one instance of an "h" code-point; two instances of an "i" code-point; three instances of an "s" code-point; one instance of an "a" code-point; two instances of a "t" code-point; and one instance of an "e" code-point.

Figure 5B:
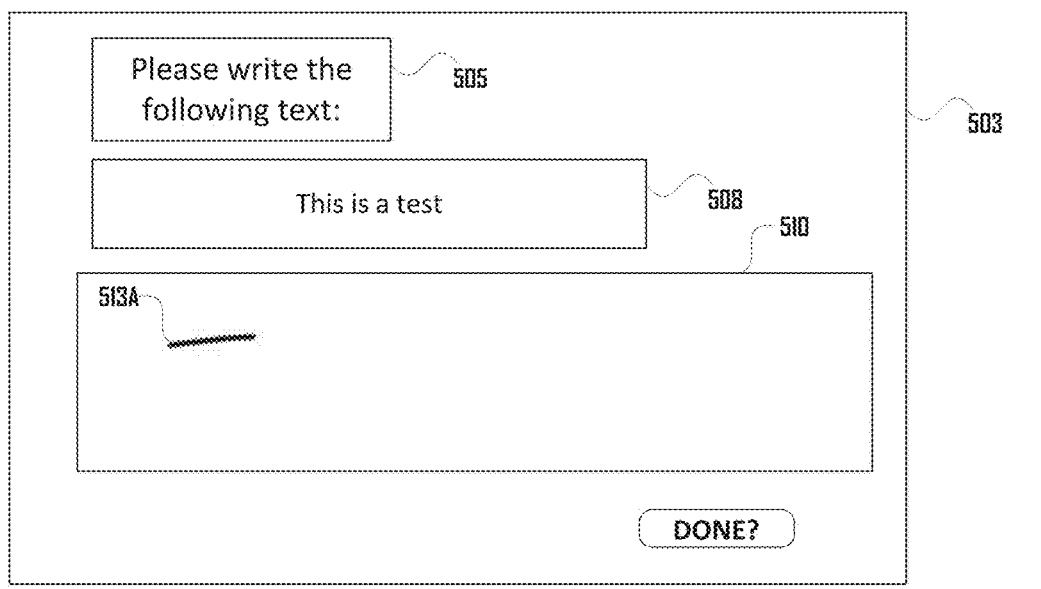

In FIG. 5B, handwriting ingestion UI 500 is illustrated in a first potential sample ingestion display state 500B. In first potential sample ingestion display state 500B, input reproduction rendering display 510 displays a visual rendering of input data corresponding to a first stroke 513A, e.g. obtained via digitizing surface device 218 in combination with digitizing marking device 220. The characteristics of such input data are discussed in more detail below, particularly in reference to FIGS. 7A-B.

Figure 5C:
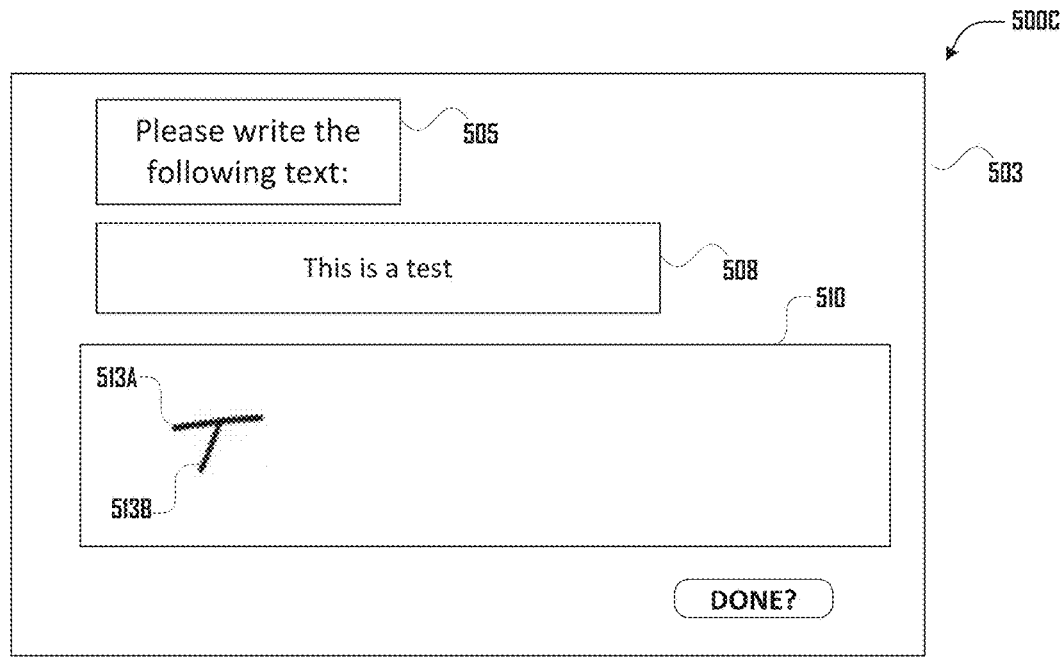

In FIG. 5C, handwriting ingestion UI 500 is illustrated in a second potential sample ingestion display state 500C. In second potential sample ingestion display state 500C, input reproduction rendering display 510 displays a visual rendering of input data corresponding to first stroke 513A and a second stroke 513B, e.g. obtained via digitizing surface device 218 in combination with digitizing marking device 220 subsequent to the first stroke. Similar to the example discussed above with reference to FIG. 4, first and second strokes 513A-B make up a glyph sample corresponding to the first, "T" code-point of the sample text.

Figure 5D:
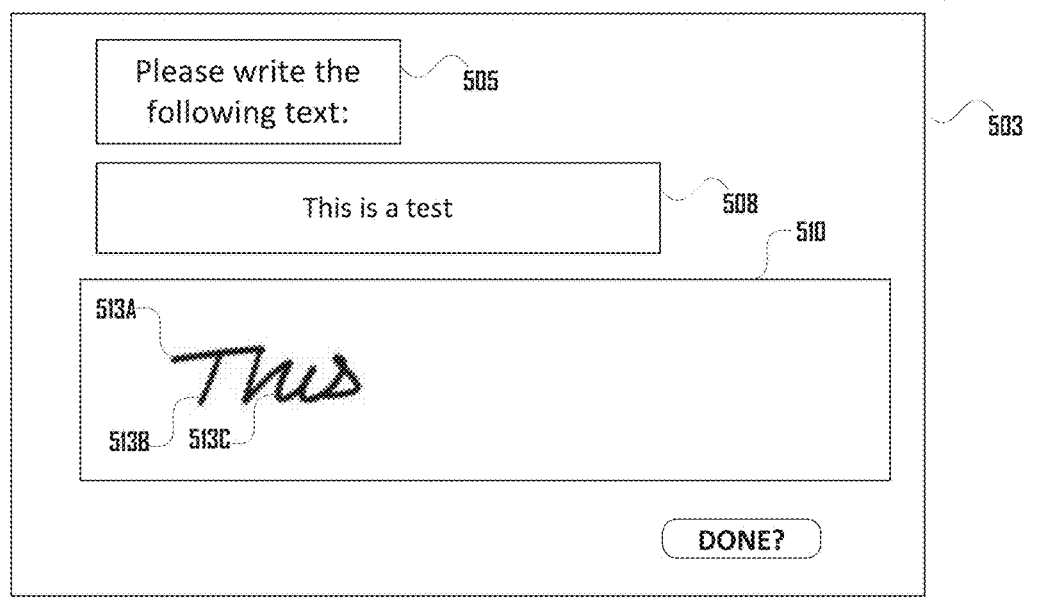

In FIG. 5D, handwriting ingestion UI 500 is illustrated in a third potential sample ingestion display state 500D. In third potential sample ingestion display state 500D, input reproduction rendering display 510 displays a visual rendering of input data corresponding to first stroke 513A, second stroke 513B, and a third stroke 513C. Similar to the example discussed above with reference to FIG. 4, third stroke 513C includes glyph samples corresponding to the "h" code-point, part of the "i" code-point, and one of the "s" code points of the sample text.

Figure 5E:
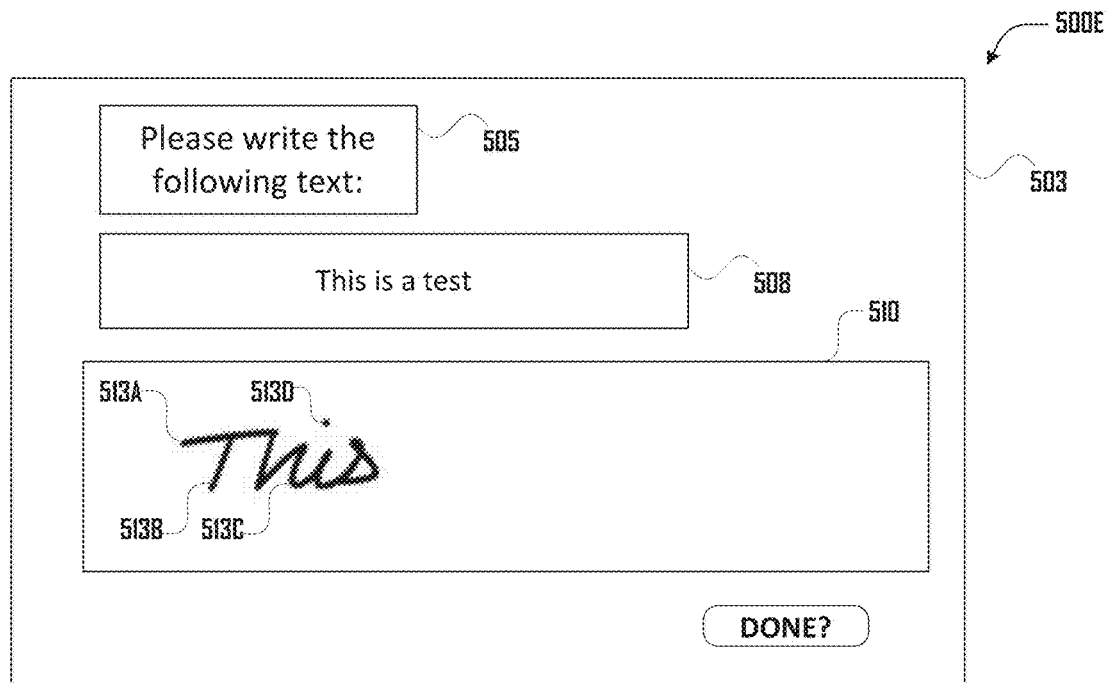

In FIG. 5E, handwriting ingestion UI 500 is illustrated in a fourth potential sample ingestion display state 500E. In fourth potential sample ingestion display state 500E, input reproduction rendering display 510 displays a visual rendering of input data corresponding to first stroke 513A, second stroke 513B, third stroke 513C, and a fourth stroke 513D. Similar to the example discussed above with reference to FIG. 4, fourth stroke 513D completes the glyph sample of the "i" code-point of the sample text began by stroke 513C.

Figure 5F:
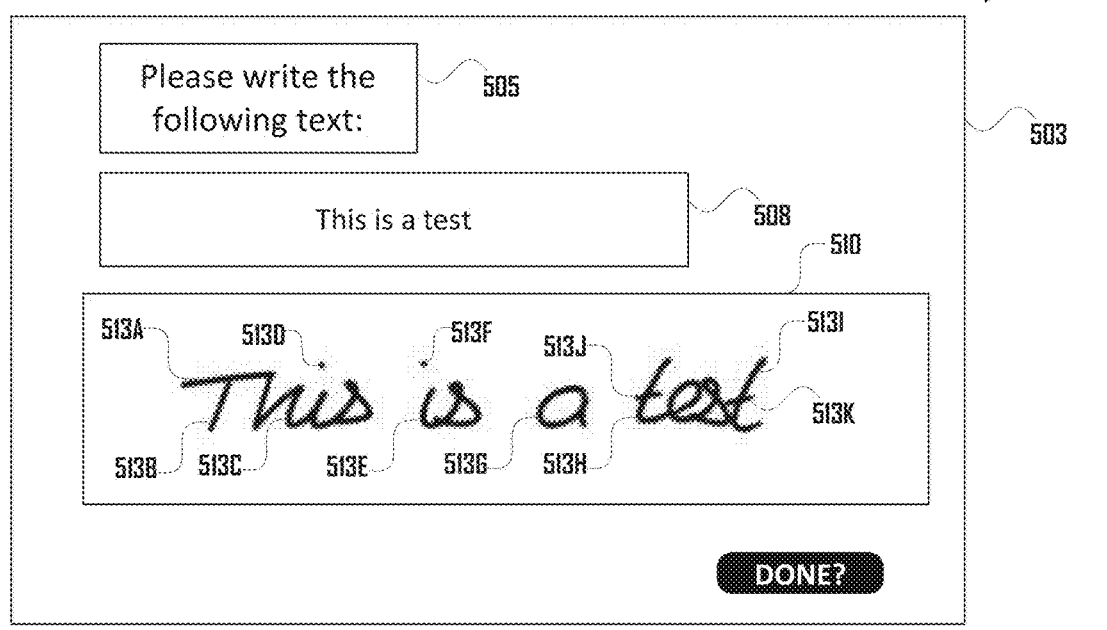

In FIG. 5F, handwriting ingestion UI 500 is illustrated in a fifth potential sample ingestion display state 500F. In fifth potential sample ingestion display state 500F, input reproduction rendering display 510 displays a visual rendering of input data corresponding to first stroke 513A, second stroke 513B, third stroke 513C, and fourth stroke 513D, along with a fifth stroke 513E, a sixth stroke 513F, a seventh stroke 513G, an eighth stroke 513H, a ninth stroke 513I, a tenth stroke 513J, and an eleventh stroke 513K. First through eleventh strokes 513A-K collectively make up glyph samples corresponding to the sample text in sample text display 508.

Figure 5G:
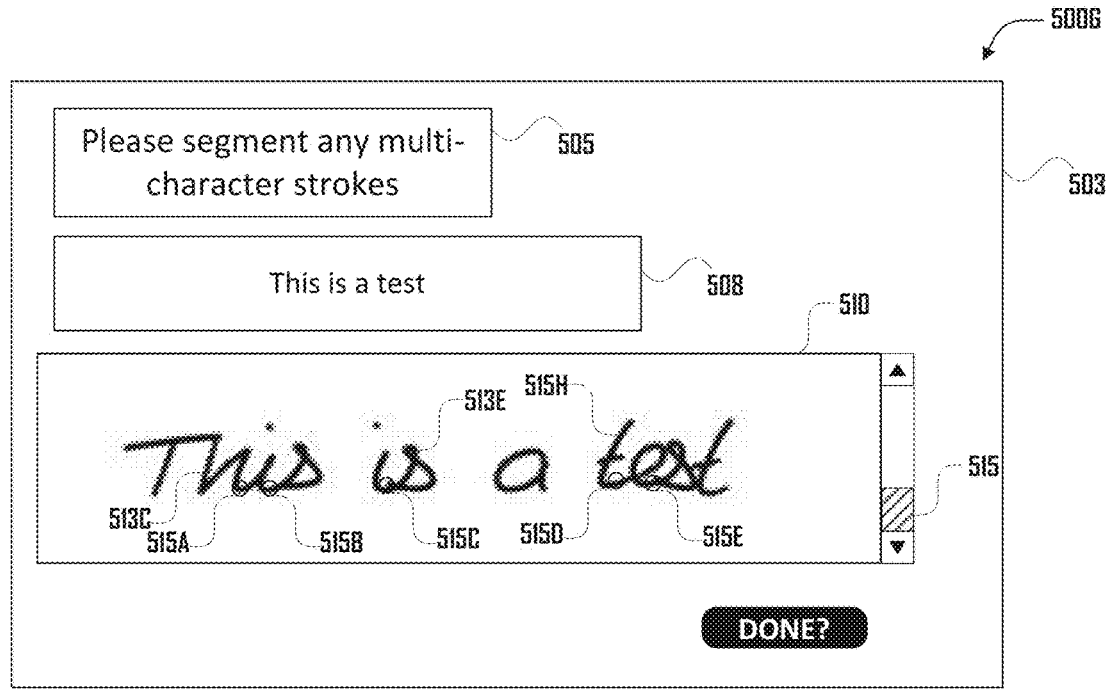

In FIG. 5G, handwriting ingestion UI 500 is illustrated in a sample segmentation state 500G. In sample segmentation state 500G, instructive prompt 505 displays text instructing a user operating client device 200 to segment any multi-character strokes displayed in input reproduction rendering display 510. For example, the user may user a mouse or other pointer-based user input 213 to select segmentation points 515 within a stroke where one glyph sample ends and another begins. In the illustrated example, third stroke 513C is segmented at two segmentation points 515A-B, fifth stroke 513C is segmented at one segmentation point 515C, and eighth stroke 513H is segmented at two segmentation points 515D-E. As is shown in FIG. 5H, third stroke 513C is segmented into three stroke segments 520A-C, fifth stroke 513C is segmented into two stroke segments 520D-E, and eighth stroke 513H is segmented into three stroke segments 520F-H.

Figure 5H:
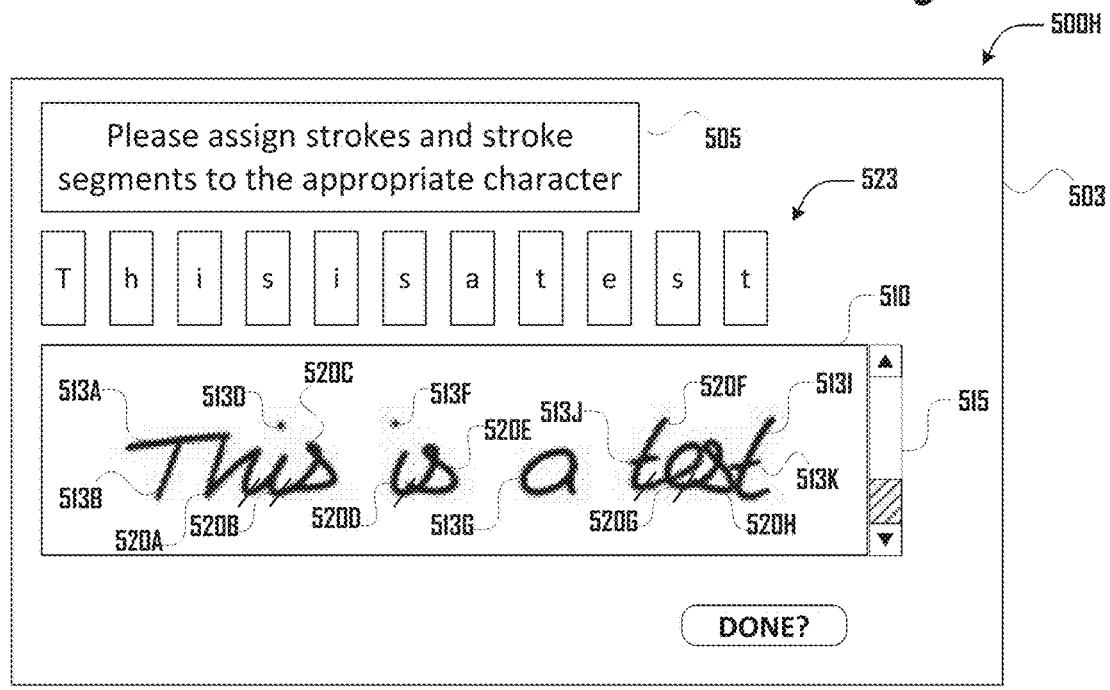

In FIG. 5H, handwriting ingestion UI 500 is illustrated in an initial stroke assignment state 500H. In initial stroke assignment state 500G, the sample text display has been replaced by a character sequence display 523 and instructive prompt 505 displays text instructing a user operating client device 200 to assign the various strokes and stroke segments displayed in reproduction rendering display 510 to a corresponding character from the character sequence display.

Figure 5I:
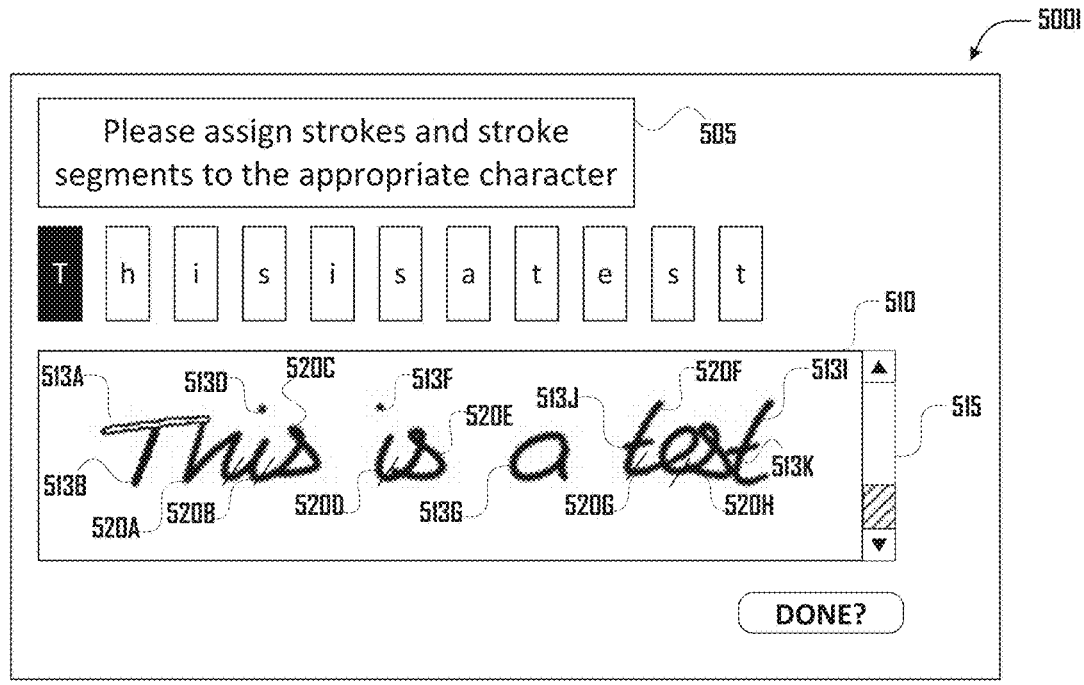

In FIG. 5I, handwriting ingestion UI 500 is illustrated in a first ongoing stroke assignment state 500I. In first ongoing stroke assignment state 500G, the first, "T" character of character sequence display 523 has been highlighted and first stroke 513A has been selected, indicating the first stroke should be associated with a glyph sample for the "T" code point.

Figure 5J:
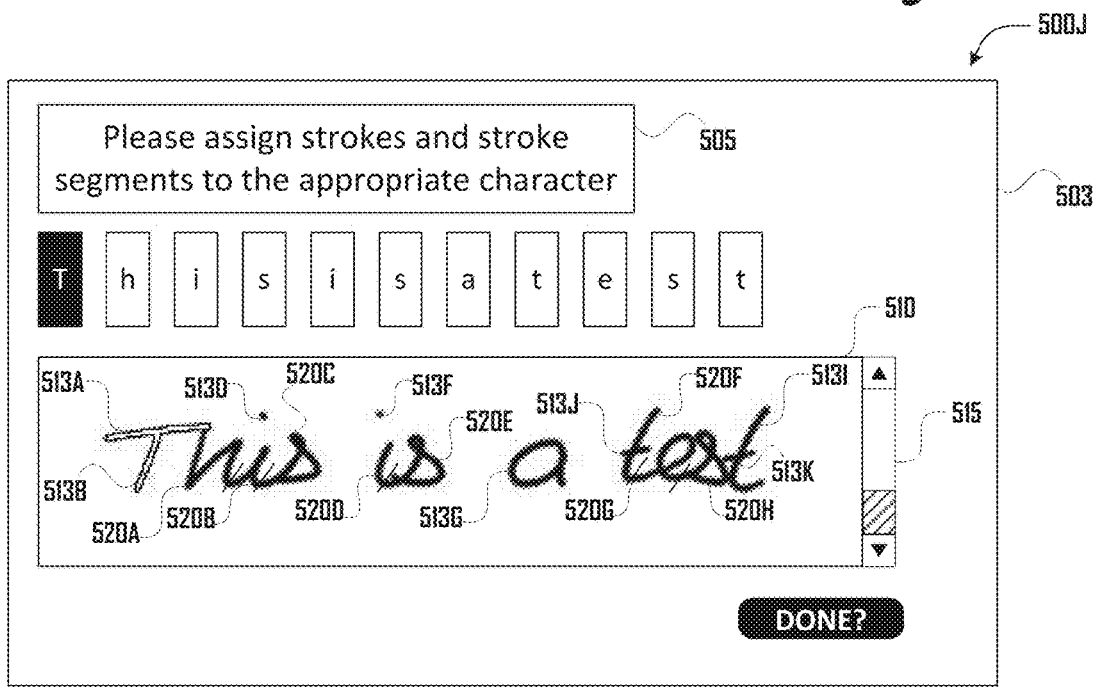

In FIG. 5J, handwriting ingestion UI 500 is illustrated in a second ongoing stroke assignment state 500J. In second ongoing stroke assignment state 500J, the first, "T" character of character sequence display 523 is still highlighted and second stroke 513B has been selected, indicating the second stroke should also be associated with the glyph sample for the "T" code point.

Figure 5K:
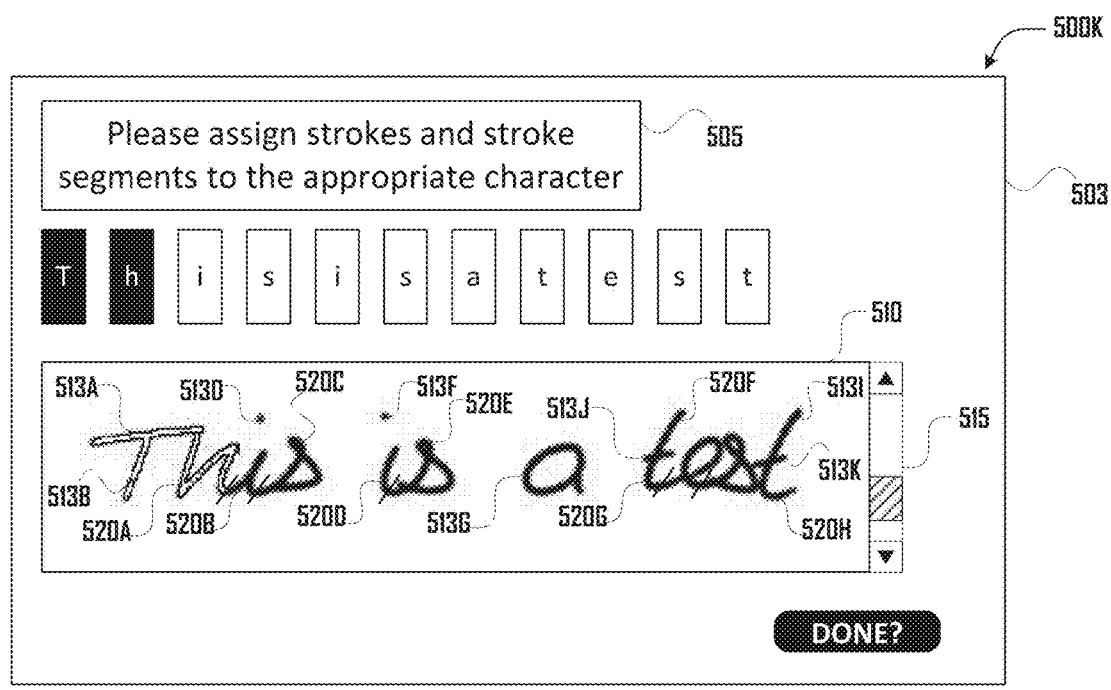

In FIG. 5K, handwriting ingestion UI 500 is illustrated in a third ongoing stroke assignment state 500K. In third ongoing stroke assignment state 500K, the second, "h" character of character sequence display 523 is now highlighted and first stroke segment 520A has been selected, indicating the first stroke segment should be associated with a glyph sample for the "h" code point. This stroke assignment process may be continued until the user indicates all strokes and stroke segments have been assigned to the appropriate glyph samples.

Code Point Sample Stroke and Stroke Segment Assignment

Figure 6:
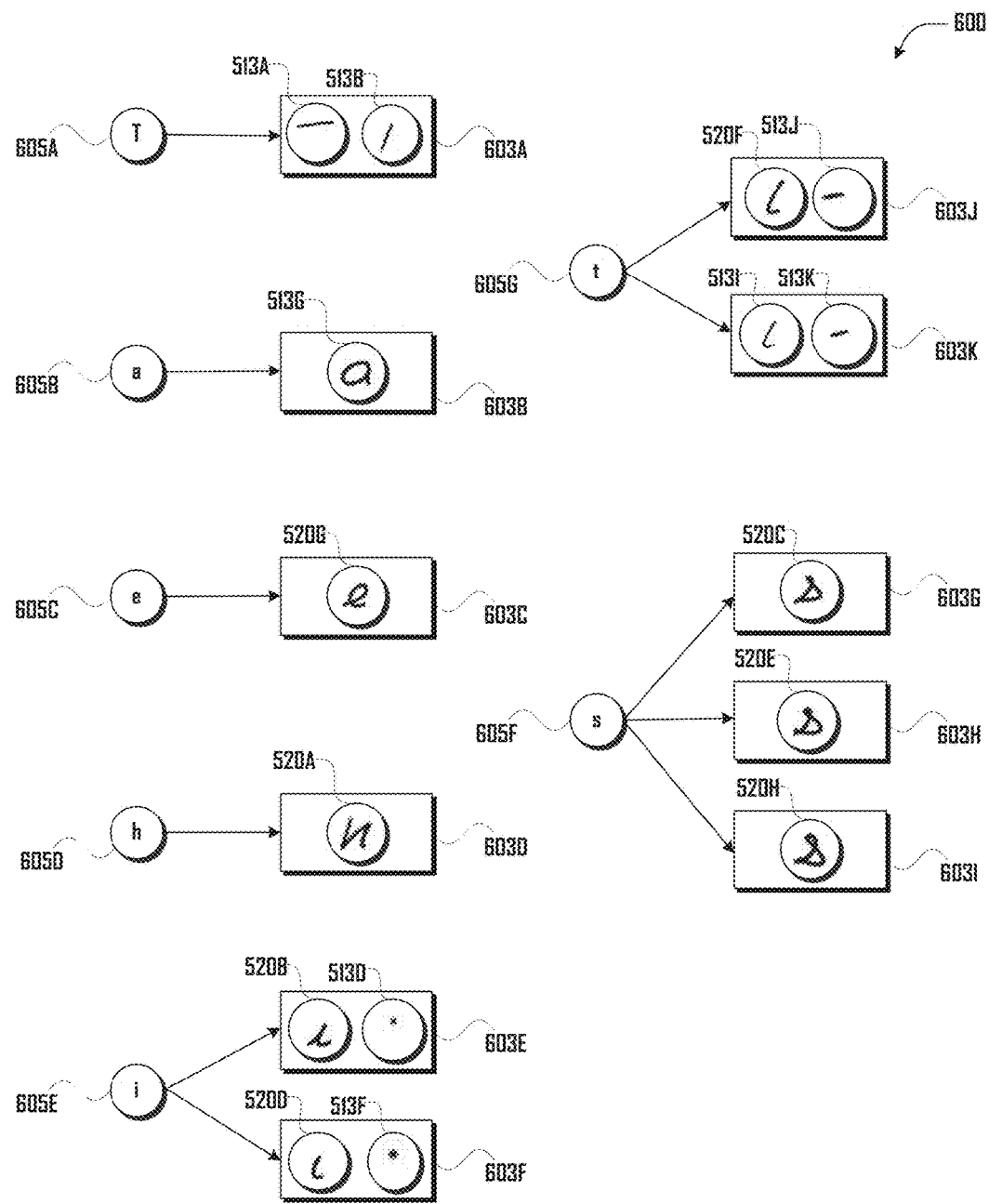
FIG. 6 illustrates a graphical representation of the relationship between character code-points, handwritten glyph representations of the character code-points, and the stroke and stroke segment structure of such handwritten glyphs.

FIG. 6 illustrates the assignments of data corresponding to various strokes and stroke samples obtained via digitizing surface device 218 and digitizing marking device 220 during the exemplary handwriting sample ingestion process described above with respect to FIGS. 5A-K are combined into glyph samples and assigned to code-points.

Data collected during stroke 513A and stroke 513B are combined to form glyph sample 603A, which is assigned to the "T" code point 605A.

Data collected during stroke 513G forms glyph sample 603B, which is assigned to the "a" code-point 605B.

Data collected during stroke segment 520G forms glyph sample 603C, which is assigned to the "e" code-point 605C.

Data collected during stroke segment 520A forms glyph sample 603D, which is assigned to the "h" code-point 605D.

Data collected during stroke segment 520B and stroke 513D are combined to form glyph sample 603E, which is assigned to the "i" code-point 605E. Data collected during stroke segment 520D and stroke 513F are combined to form glyph sample 603F, which is also assigned to the "i" code-point 605E.

Data collected during stroke segment 520F and stroke 513J are combined to form glyph sample 603J, which is assigned to the "t" code-point 605F. Data collected during stroke 513I and stroke 513K are combined to form glyph sample 603K, which is also assigned to the "t" code-point 605F.

Data collected during stroke segment 520C forms glyph sample 603G, which is assigned to the "s" code-point 605G. Data collected during stroke segment 520E forms glyph sample 603H, which is also assigned to the "s" code-point 605G. Data collected during stroke segment 520C forms glyph sample 603G, which is assigned to the "s" code-point 605G. Data collected during stroke segment 520H forms glyph sample 603I, which is also assigned to the "s" code-point 605G.

Glyph Sample Data and Data Collection

FIGS. 7A-B illustrate respective graphical representations 700A-B of stroke data collected by client handwriting ingestion application 228 during stroke 513A and stroke 513B (which combine to form a capital letter "T" in the English language) in the example described above and obtained via digitizing surface device 218 and digitizing marking device 220.

Referring to FIG. 7A, stroke data obtained from digitizing surface device 218 and digitizing marking device 220 corresponding to strokes, such as strokes 513A-B, may take the form of a time-based series of sampled stroke dimensional data values. Stroke 513A extends from an origin point 703A, through a series of intermediate points 703B-I, to a termination point 703J. Stoke 513B extends from an origin point 705A, through a series of intermediate points 705B-H, to a termination point 705I.

An exemplary handwriting code point set data structure (hw_cp_set_DS) may include a character map data structure and other associated values corresponding to various aspects of the code point set, such as a user identifier value, an average character width value, an average character height value, a maximum character height value, and the like.

An exemplary character map data structure (char_map_DS) may include a plurality of code point data structures, e.g. a code point data structure for each character in the code point set (A, B, C, D, . . . T, . . . h, i, . . . s, . . . ).

An exemplary code point data structure may include one or more code point sample data structures, e.g. a code point sample data structure for each code point sample obtained for a given code point.

An exemplary code point sample data structure may include one or more stroke data structures, e.g. a stroke data structure corresponding to each stroke within a given code point sample. A code point sample data structure may also include values corresponding to the source of the sample (e.g. the word "This") and the relative position within the source (e.g. 0 in the case of "T," 1 in the case of "h," etc.).

An exemplary stroke data structure may include of a time-based series of sampled stroke dimensional data values, e.g. data values corresponding to a time value (representing the sampling interval of the stroke), relative horizontal position or displacement values, relative vertical position or displacement values, pressure values, spin values, angle values, and the like. (Examples of the horizontal position values, vertical position values, and pressure values are visually depicted in FIGS. 7A-B (with pressure values being illustrated by data point diameter).)

Thus, an exemplary handwriting code point set data structure may be representable as:

```
hw_cp_set_DS{
    char_map_DS: {
        ...
        A': [
            Sample_1{
                Strokes: [
                    Stroke_1{
                        Times: [T_0, T_1, T_2, ..., T_n],
                        Xs: [X_0, X_1, X_2, ..., X_n],
                        Ys: [Y_0, Y_1, Y_2, ..., Y_n],
```

-continued

```
              Pressures: [P_0, P_1, P_2, ..., P_n],
              Spins: [S_0, S_1, S_2, ..., S_n]
              Angles: [A_0, A_1, A_2, ..., A_n]
            }, Stroke_2 {
              Times: [T_0, T_1, T_2, ..., T_m],
              Xs: [X_0, X_1, X_2, ..., X_m],
              Ys: [Y_0, Y_1, Y_2, ..., Y_m],
              Pressures: [P_0, P_1, P_2, ..., P_m],
              Spins: [S_0, S_1, S_2, ..., S_m]
              Angles: [A_0, A_1, A_2, ..., A_m]
            }, Stroke_3 {
              ...
            } ...
          ]
        } Sample_2 {
          Strokes:[
            ...
          ]
        } Sample_3 {
          ...
        }
        ...
      ] B'[
      ...
    }
```

Exemplary Series of Communications

Figure 8:
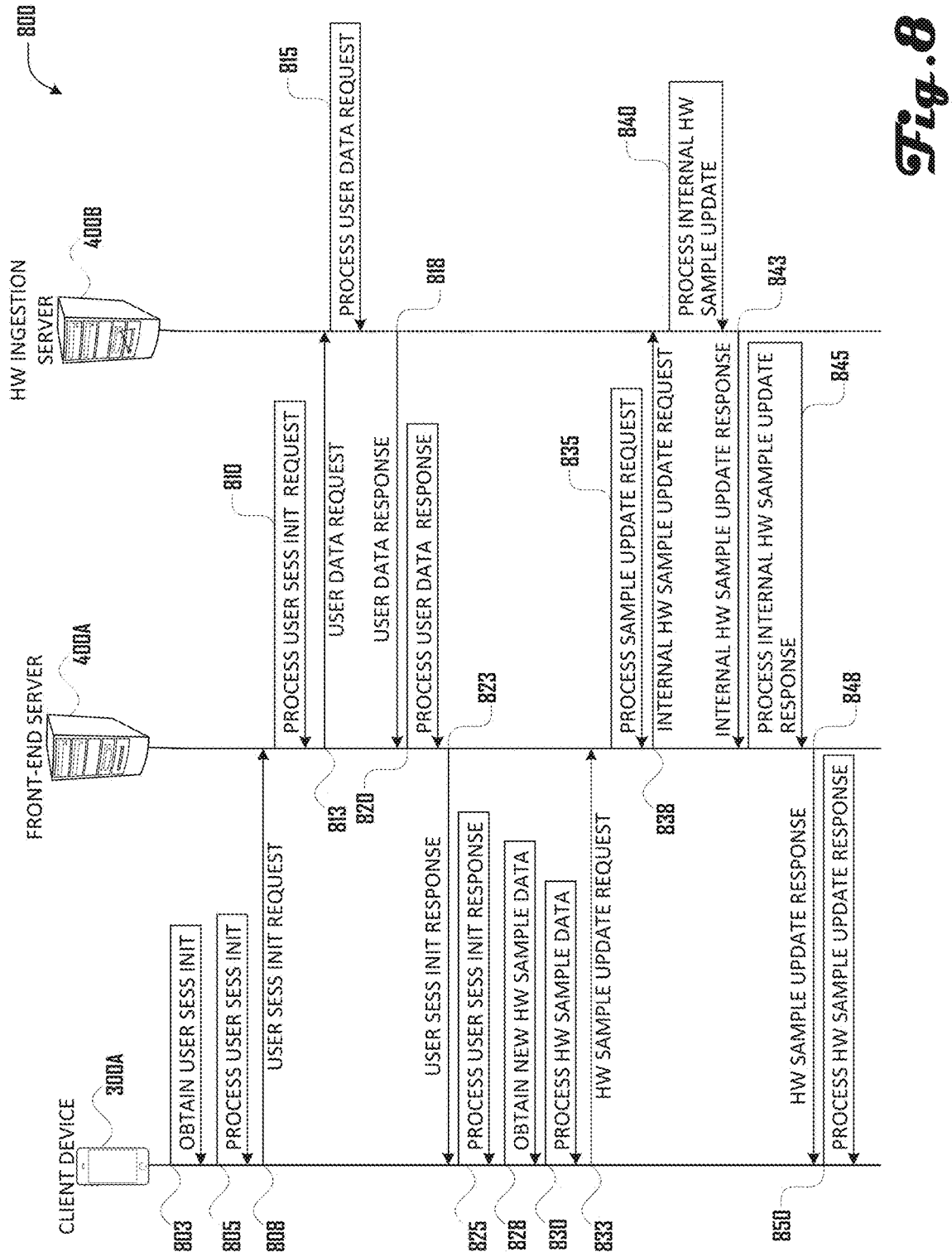
FIG. 8 illustrates a series of data communications between various components of the client/server-based handwriting ingestion system in accordance with various embodiments.

FIG. 8 illustrates a first exemplary series of communications 800 between client device 200A, front-end server 300A, and handwriting ingestion server 300B in accordance with various embodiments of an exemplary client/server-based handwriting ingestion system, such as the exemplary client/server-based handwriting ingestion system illustrated in FIG. 1.

Client device 200A may obtain 803 and process 805 a user session initiation command, e.g. via user input 213 in response to a prompt provided via display 215.

Client device 200A may provide front-end server 300A with a corresponding user session initiation request 808. User session initiation request 808 may include user identifying information corresponding to a user of client device 200A, e.g. via an alphanumeric identifier associated with a user, and the like.

Front-end server 300A may process 810 user session initiation request 808. For example, front-end server 300A may instantiate a user session associated with the user identifying information, obtain additional meta-data relating to the user identifying information, e.g. from administrative data store 105 and/or other sources, and the like.

Front-end server 300A may provide handwriting ingestion server 300B with a user data request 813. User data request 813 may include data obtained from client device 200A via user session initiation request 808, such as a user identifier, and via processing 810 the user session initiation request by front-end server 300A.

Handwriting ingestion server 300B may process 815 user data request 813. For example, handwriting ingestion server 300B may obtain handwriting sample data associated with the user identifier, e.g. from handwriting sample set data store 108, determine a measure of handwriting sample set completeness, and the like.

Handwriting ingestion server 300B may then provide a user data response 818 to front-end server 300A.

Front-end server 300A may then process 820 user data response 818, e.g. by parsing the user data response to extract data to pass on to client device 200.

Front-end server 300A may then provide a user session initiation response 823 to client device 200A. User session initiation response 823 may include a user session identifier, handwriting sample set data, and/or the like.

Client device 200A may then process 825 user session initiation response 820, for example by rendering information provided in the user session initiation response via display 215.

Client device 200A may then obtain 828 and process 830 new handwriting sample data, such as in the manner described above in reference to FIGS. 5A-K, to obtain stroke dimension data for one or more glyph samples.

Client device 200A may provide front-end server 300A with a corresponding handwriting sample update request 833. Handwriting sample update request 833 may include the user session identifier, code-point identifiers, stroke dimension data from one or more glyph samples, and/or the like.

Front-end server 300A may process 835 handwriting sample update request 833 and provide handwriting ingestion server 300B with an internal handwriting sample update request 838. Internal handwriting sample update request 838 may include the user identifier associated with the user session, code-point identifiers, stroke dimension data from one or more glyph samples, and/or the like.

Handwriting ingestion server 300B may process 840 internal handwriting sample update request 838. For example, handwriting ingestion server 300B may store the stroke dimension data in handwriting sample set data store 108 associated with the respective user identifier and code-point identifiers, determine an updated measure of handwriting sample set completeness, and the like.

Handwriting ingestion server 300B may then provide an internal handwriting sample update response 843 to front-end server 300A. For example, internal handwriting sample update response 843 may include an acknowledgement the handwriting sample set associated with the user identifier has been updated, the updated measure of handwriting sample set completeness, and the like.

Front-end server 300A may then process 845 internal handwriting sample update response 843 and provide a handwriting sample update response 848 to client device 200A. Handwriting sample update response 848 may include an acknowledgement the handwriting sample set associated with the user identifier has been updated, the updated measure of handwriting sample set completeness, and the like.

Client device 200A may then process 850 handwriting sample update response 848, for example by rendering information provided in the handwriting sample update response via display 215, and the like.

Handwriting Sample Ingestion Routine

Figure 9:
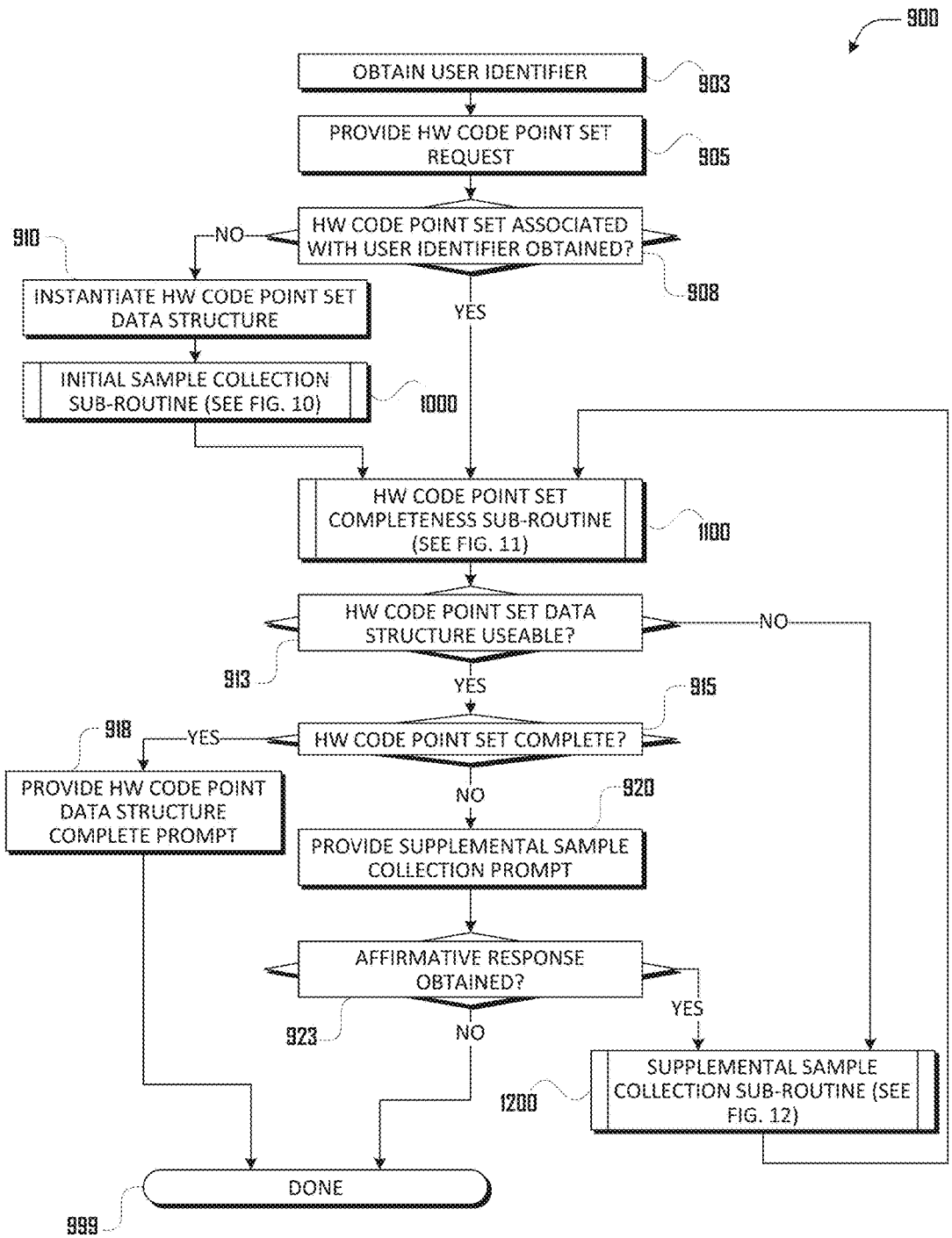
FIG. 9 illustrates a functional block diagram of a handwriting sample ingestion routine which may be implemented by a client device of the client/server-based handwriting ingestion system in accordance with various embodiments.

FIG. 9 illustrates an exemplary handwriting sample ingestion routine 900, which may be implemented by client handwriting ingestion application 228 operating on a client device, such as client devices 200A-B.

Handwriting sample ingestion routine 900 may obtain a user identifier at execution block 903. For example, client handwriting ingestion application 228 may obtain a user identifier via a user input 213 in response to a user's interaction with a user login interface, a user profile file stored in memory 205, or the like.

Handwriting sample ingestion routine 900 may provide a handwriting code-point set request, including the user identifier, at execution block 905. For example, client handwriting application may provide the handwriting code-point set request to front-end server 300B via network 103.

At decision block 908, if a handwriting code-point set associated with the user identifier is obtained, e.g. from front-end server 300B (or directly from handwriting ingestion server 300A) via network 103 in response to the handwriting code point set request, then handwriting sample ingestion routine 900 may call a handwriting code-point set completeness sub-routine 1100, described below in reference to FIG. 11; otherwise handwriting sample ingestion routine 900 may proceed to execution block 910.

Handwriting sample ingestion routine 900 may then call an initial sample collection sub-routine 1000, described below in reference to FIG. 10.

Handwriting sample ingestion routine 900 may then call handwriting code-point set completeness sub-routine 1100.

At decision block 913, if the result of handwriting code-point set completeness sub-routine 1100 indicates the handwriting code-point set in its current state is useable, handwriting sample ingestion routine 900 may proceed to decision block 915; otherwise handwriting sample ingestion routine 900 may call a supplemental sample collection sub-routine 1200, discussed below in reference to FIG. 12. After the completion of supplemental sample collection sub-routine 1200, handwriting sample ingestion routine 900 may loop back to handwriting code point set completeness sub-routine block 1100.

At decision block 915, if the result of handwriting code-point set completeness sub-routine 1100 indicates the handwriting code-point set in its current state is complete, handwriting sample ingestion routine 900 may proceed to execution block 918; otherwise, 900 may proceed to execution block 920.

At execution block 918, handwriting sample ingestion routine 900 may provide a handwriting code point data structure complete prompt, e.g. via display 215, to inform the user of client device 200 that no additional handwriting samples are needed. Handwriting sample ingestion routine 900 may then proceed to termination block 999.

At execution block 920, handwriting sample ingestion routine 900 may provide a supplemental sample collection prompt, e.g. via display 215, to inform the user of client device 200 that the handwriting code point set data structure is usable, but that additional samples may improve the results of handwriting generation services, and inviting the user to provide additional samples.

At decision block 923, if handwriting sample ingestion routine 900 obtains an affirmative response to the supplemental sample collection prompt, then handwriting sample ingestion routine 900 may call supplemental sample collection sub-routine 1200; otherwise, handwriting sample ingestion routine 900 may proceed to termination block 999.

Handwriting sample ingestion routine 900 may end at termination block 999.

Initial Sample Collection Sub-Routine

Figure 10:
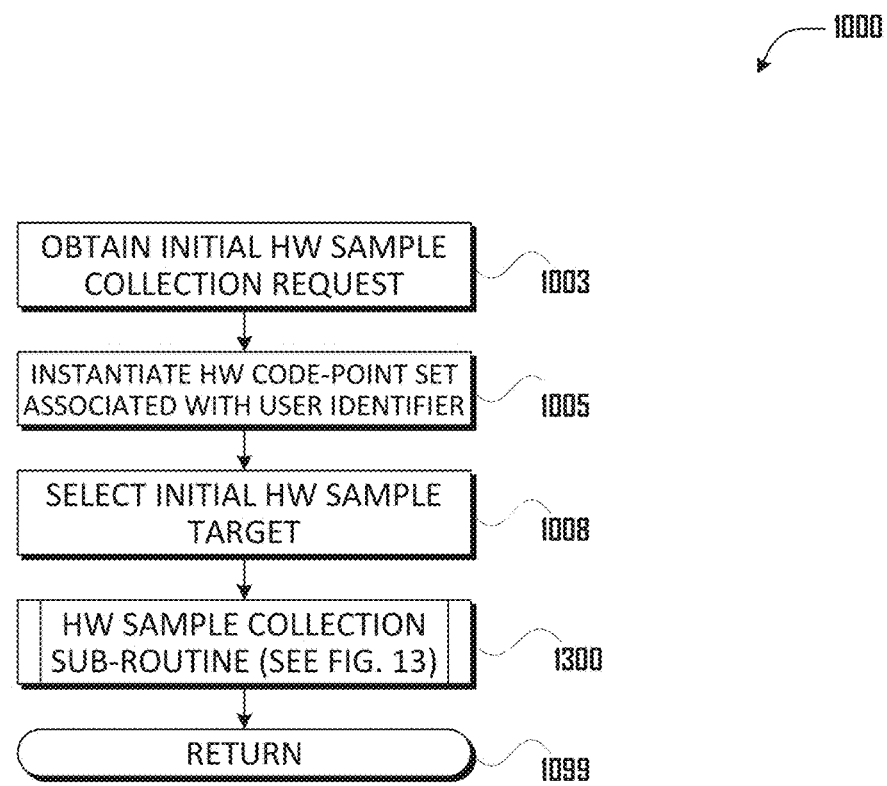
FIG. 10 illustrates a functional block diagram of an initial sample collection sub-routine which may be implemented by a client device of the client/server-based handwriting ingestion system in accordance with various embodiments.

FIG. 10 illustrates an exemplary initial handwriting sample collection sub-routine 1000, which may be implemented by client handwriting ingestion application 228, e.g. in response to a call from handwriting sample ingestion routine 900.

Handwriting sample collection sub-routine 1000 may obtain an initial handwriting sample collection request at execution block 1003. The initial handwriting sample collection request may include a user identifier.

Handwriting sample collection sub-routine 1000 may instantiate a handwriting code-point set data structure and associate the handwriting code-point set data structure with the user identifier at execution block 1005.

Handwriting sample collection sub-routine 1000 may select an initial handwriting sample at execution block 1008. For example, handwriting sample collection sub-routine 1000 may obtain a handwriting style identifier associated with the user identifier and then obtain a handwriting sample identifier associated with the handwriting style identifier.

Handwriting sample collection sub-routine 1000 may then call a handwriting sample collection sub-routine 1300, described below in reference to FIG. 13, which may include providing the handwriting sample identifier to handwriting sample collection sub-routine 1300.

Handwriting sample collection sub-routine 1000 may return, e.g. to handwriting sample ingestion routine 900, at return block 1099.

Handwriting Code Point Set Completeness Sub-Routine

Figure 11A:
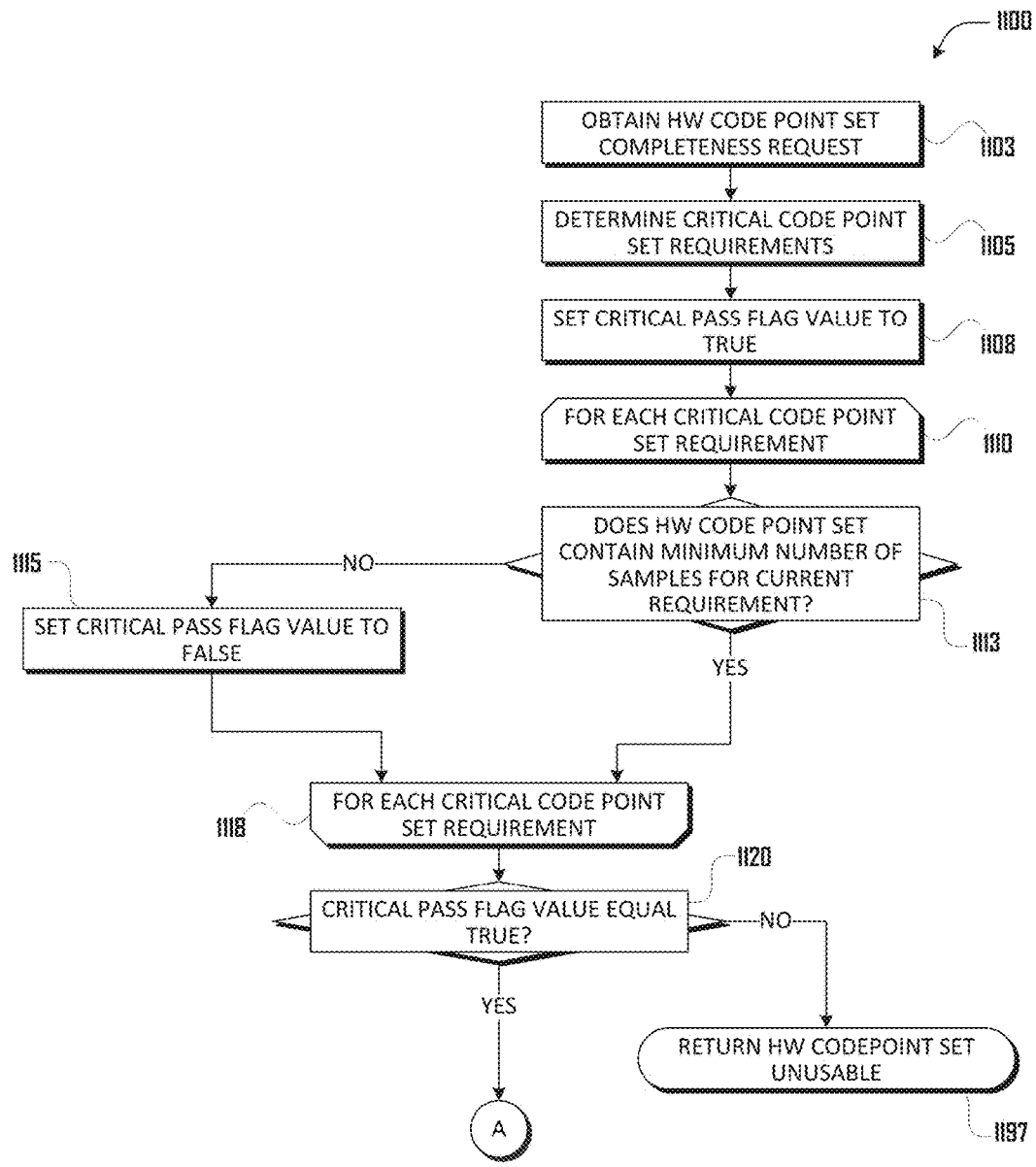
FIGS. 11A-B illustrate a functional block diagram of a handwriting code-point set completeness sub-routine which may be implemented by a client device of the client/server-based handwriting ingestion system in accordance with various embodiments.
Figure 11B:
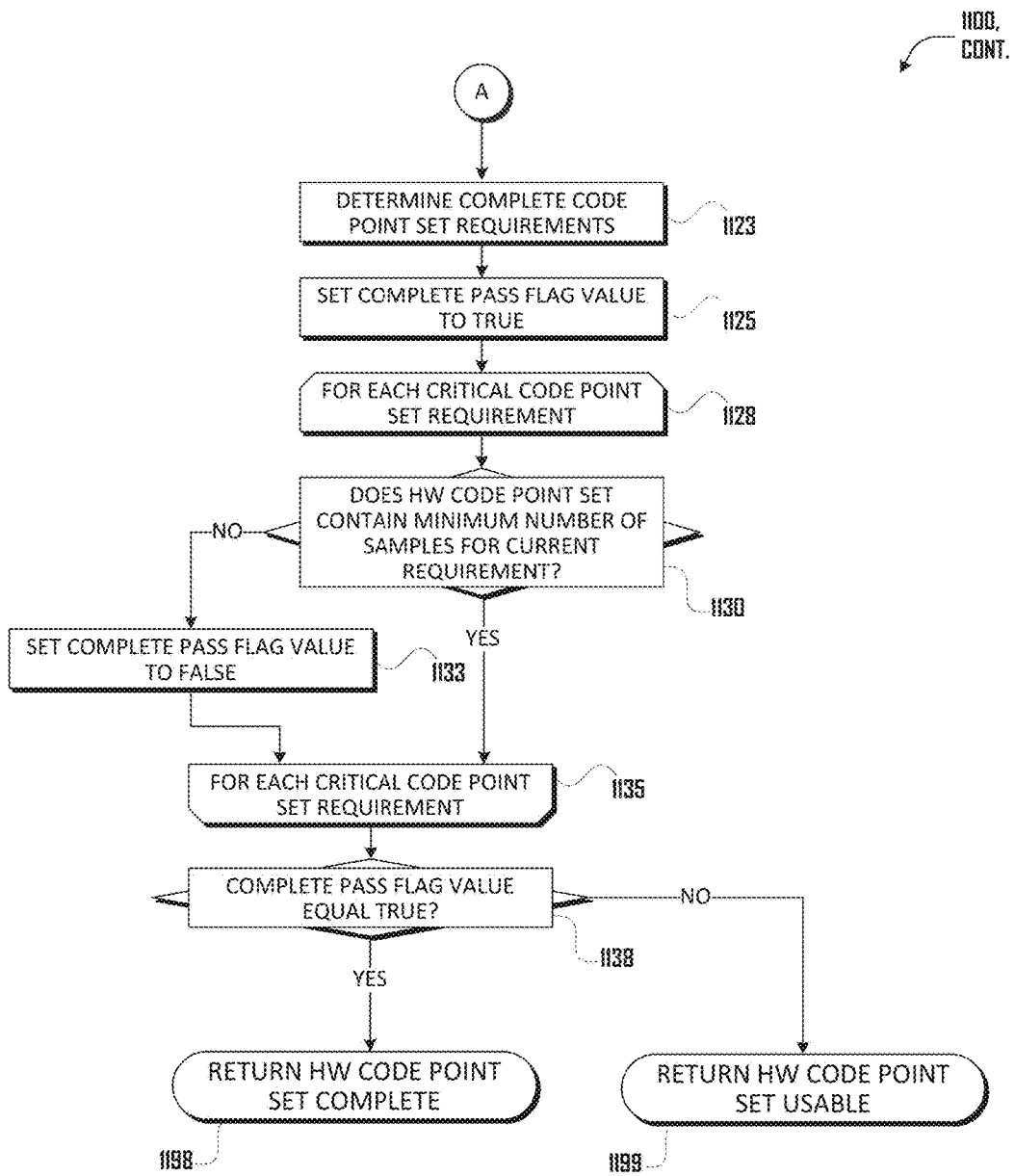

FIGS. 11A-B illustrate an exemplary handwriting code point set completeness sub-routine 1100, which may be implemented by client handwriting ingestion application 228, e.g. in response to a call from handwriting sample ingestion routine 900.

Referring to FIG. 11A, handwriting code point set completeness sub-routine 1100 may obtain a handwriting code point set completeness request at execution block 1103. Handwriting code point set completeness request may include a user identifier, a handwriting code point set data structure identifier and a handwriting style identifier.

Handwriting code point set completeness sub-routine 1100 may determine one or more critical code point set requirements associated with the handwriting style identifier at execution block 1105.

Handwriting code point set completeness sub-routine 1100 may set a critical pass flag value to true at execution block 1108.

At starting loop block 1110, handwriting code point set completeness sub-routine 1100 may process each critical code point set requirement in turn.

At decision block 1113, if the handwriting code point set data structure associated with the handwriting code point set data structure identifier does not contain a minimum acceptable number of glyph samples for the current critical code point set requirement, handwriting code point set completeness sub-routine 1100 may proceed to execution block 1115; otherwise handwriting code point set completeness sub-routine 1100 may proceed to ending loop block 1118.

Handwriting code point set completeness sub-routine 1100 may set the critical pass flag value to false at execution block 1115.

At ending loop block 1118, handwriting code point set completeness sub-routine 1100 may loop back to starting loop block 1110 and process the next critical code point set requirement, if any.

At decision block 1120, if the critical pass flag false is equal to true, handwriting code point set completeness sub-routine 1100 may proceed to execution block 1123 (FIG. 11B); otherwise handwriting code point set completeness sub-routine 1100 may proceed to return block 1197.

Referring now to FIG. 11B, handwriting code point set completeness sub-routine 1100 may determine one or more complete code point set requirements associated with the handwriting style identifier at execution block 1123.

Handwriting code point set completeness sub-routine 1100 may set a complete pass flag value to true at execution block 1125.

At starting loop block 1128, handwriting code point set completeness sub-routine 1100 may process each complete code point set requirement in turn.

At decision block 1130, if the handwriting code point set data structure associated with the handwriting code point set data structure identifier does not contain a minimum acceptable number of glyph samples for the current complete code point set requirement, handwriting code point set completeness sub-routine 1100 may proceed to execution block 1133; otherwise handwriting code point set completeness sub-routine 1100 may proceed to ending loop block 1135.

Handwriting code point set completeness sub-routine 1100 may set the complete pass flag value to false at execution block 1133.

At ending loop block 1135, handwriting code point set completeness sub-routine 1100 may loop back to starting loop block 1128 and process the next complete code point set requirement, if any.

At decision block 1138, if the complete pass flag false is equal to true, handwriting code point set completeness sub-routine 1100 may proceed to return block 1198; otherwise handwriting code point set completeness sub-routine 1100 may proceed to return block 1199.

At return block 1197, handwriting code point set completeness sub-routine 1100 may return a handwriting code point set unusable message, e.g. to handwriting sample ingestion routine 900.

At return block 1198, handwriting code point set completeness sub-routine 1100 may return a handwriting code point set complete message, e.g. to handwriting sample ingestion routine 900.

At return block 1199, handwriting code point set completeness sub-routine 1100 may return a handwriting code point set usable message, e.g. to handwriting sample ingestion routine 900.

Supplemental Sample Collection Sub-Routine

Figure 12:
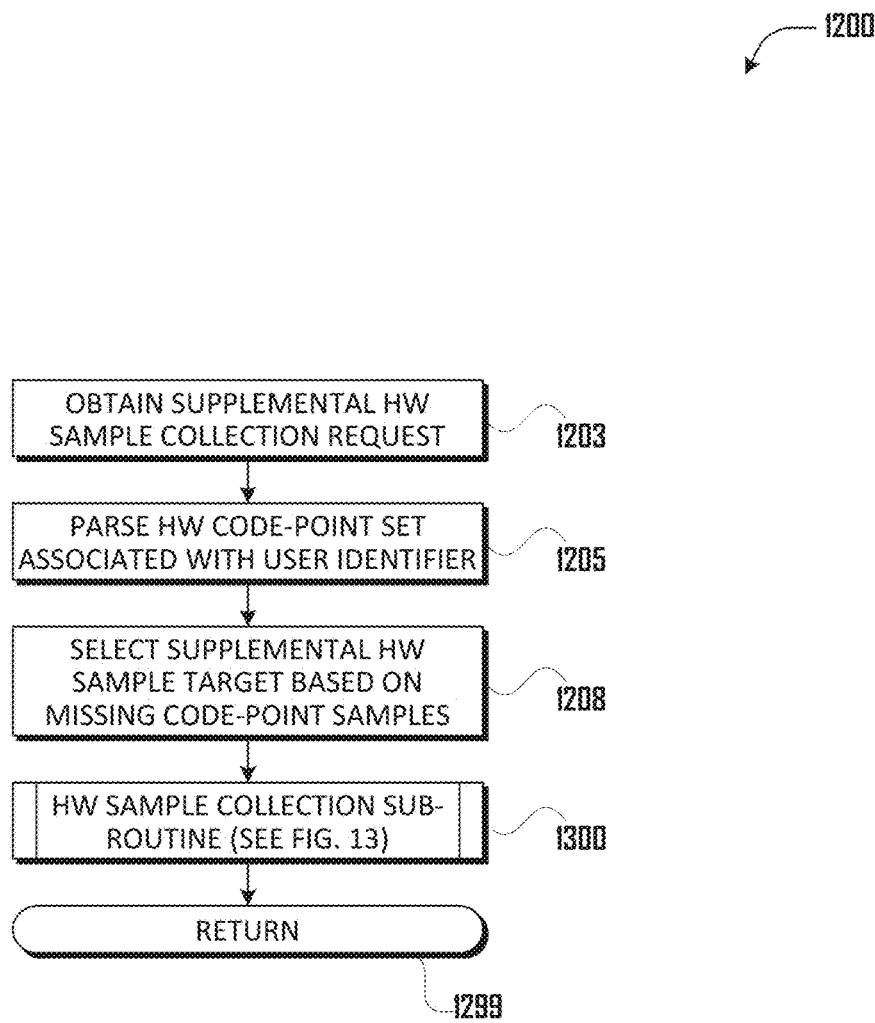
FIG. 12 illustrates a functional block diagram of a supplemental sample collection sub-routine which may be implemented by a client device of the client/server-based handwriting ingestion system in accordance with various embodiments.

FIG. 12 illustrates an exemplary supplemental sample collection sub-routine 1200, which may be implemented by client handwriting ingestion application 228, e.g. in response to a call from handwriting sample ingestion routine 900.

Supplemental sample collection sub-routine 1200 may obtain a supplemental handwriting sample collection request at execution block 1203. The supplemental handwriting sample collection request may include a user identifier and/or a handwriting code point set data structure identifier.

Supplemental sample collection sub-routine 1200 may parse a handwriting code point set data structure associated with the handwriting code point set data structure identifier at execution block 1205. For example, supplemental sample collection sub-routine 1200 may determine one or more code-points for which the handwriting code point set data structure identifier does not contain a minimum acceptable number of glyph samples.

Supplemental sample collection sub-routine 1200 may select a supplemental handwriting sample target at execution block 1208. For example, supplemental sample collection sub-routine 1200 may select a supplemental handwriting sample target based on the one or more code-points for which the handwriting code point set data structure identifier does not contain a minimum acceptable number of glyph samples.

Supplemental sample collection sub-routine 1200 may then call handwriting sample collection sub-routine 1300, described below in reference to FIG. 13, which may include providing the supplemental handwriting sample target identifier to handwriting sample collection sub-routine 1300.

Supplemental sample collection sub-routine 1200 may return, e.g. to handwriting sample ingestion routine 900, at return block 1299.

Handwriting Sample Collection Sub-Routine

Figure 13B:
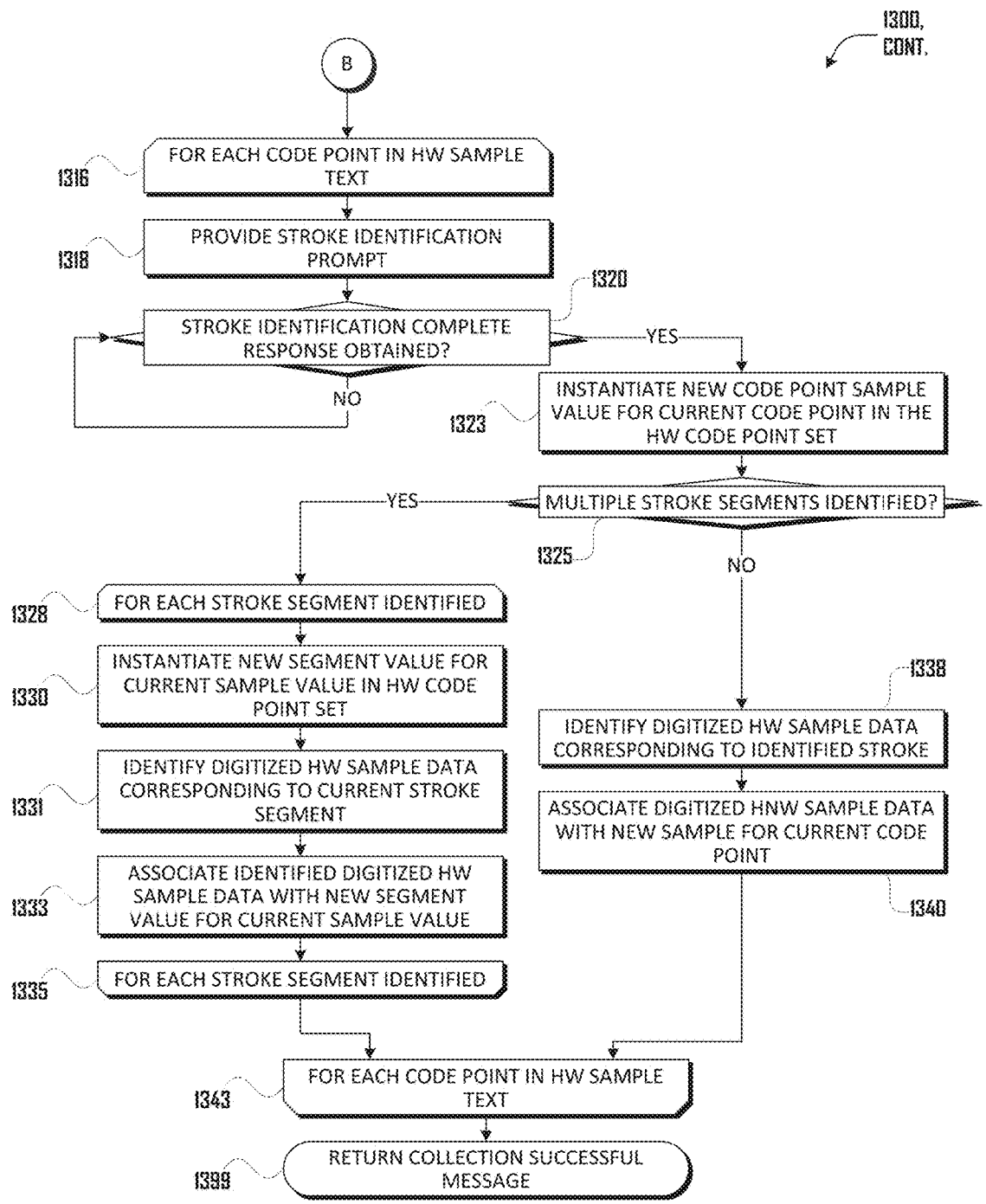
Figure 15A:
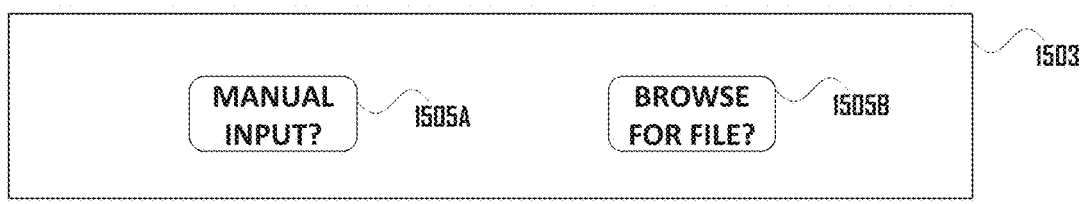
FIGS. 15A-D illustrate a general schematic diagram of an exemplary handwriting generation user interface suitable for use with the client/server-based handwriting generation system in accordance with various embodiments.
Figure 15B:
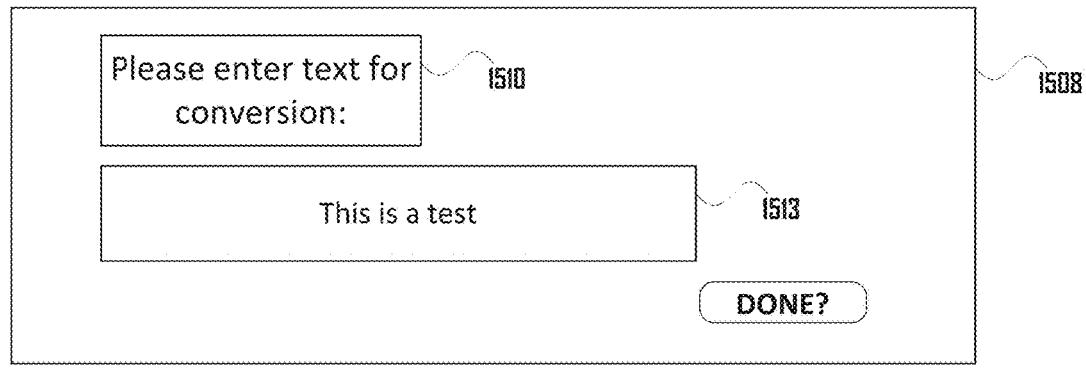
Figure 15C:
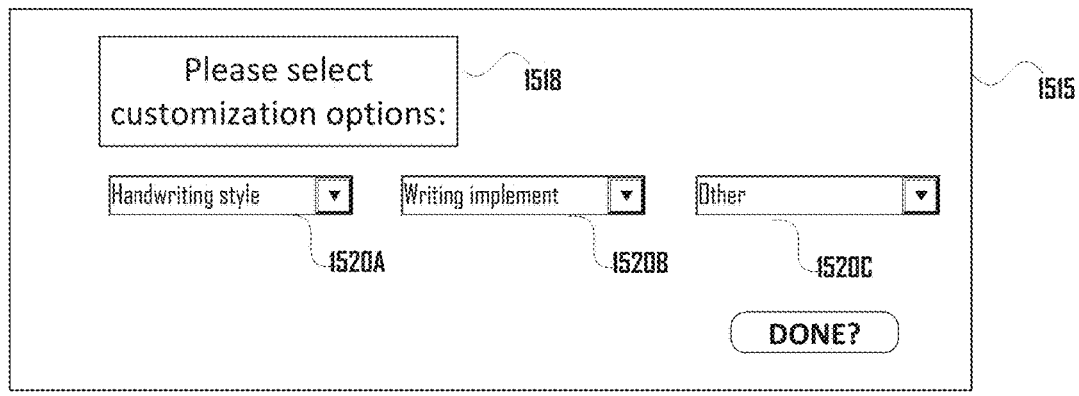
Figure 15D:
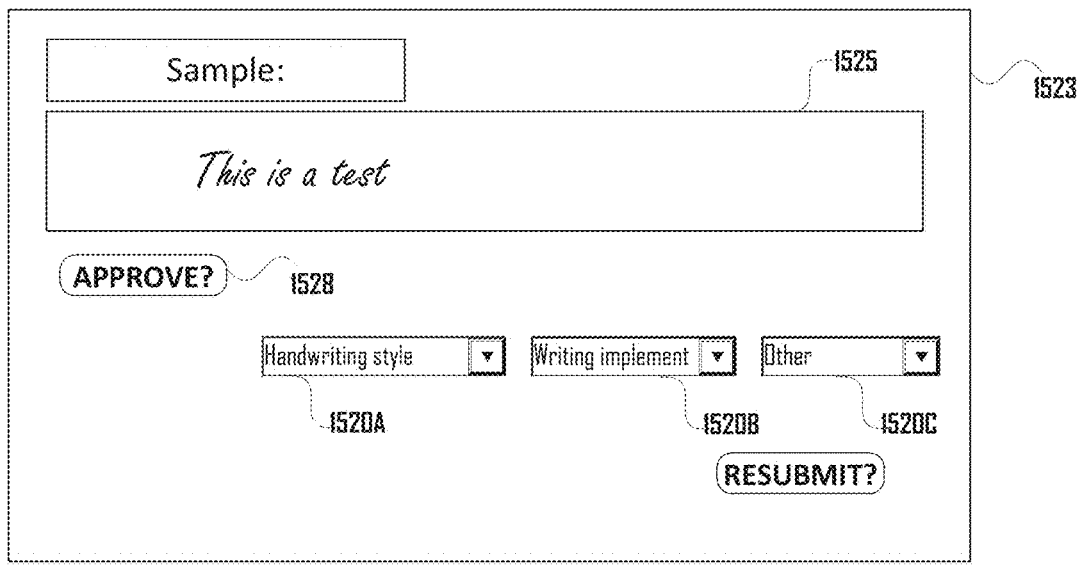

FIGS. 13A-B illustrate an exemplary handwriting sample collection sub-routine 1300, which may be implemented by client handwriting ingestion application 228, e.g. in response to a call from initial sample collection sub-routine 1000 or supplemental sample collection supplemental sample collection sub-routine 1200.

Referring to FIG. 13A, handwriting sample collection sub-routine 1300 may obtain a handwriting sample collection request at execution block 1303.

Handwriting sample collection sub-routine 1300 may render a visual representation of the handwriting sample text, e.g. via display 215, at execution block 1305 (see sample text display 508, FIG. 5).

At decision block 1308, if digitized handwriting sample data collection is complete, then handwriting sample collection sub-routine 1300 may proceed to execution block 1311; otherwise handwriting sample collection sub-routine 1300 may proceed to decision block 1309.

At decision block 1309, if a sample collection period timeout or user cancellation interrupt has been received, handwriting sample collection sub-routine 1300 may proceed to return block 1398.

At execution block 1310, handwriting sample collection sub-routine 1300 may obtain digitized handwriting sample data, such as the digitized handwriting sample data described above with respect to FIGS. 7A-B, representative of the handwriting sample text and captured by digitizing marking surface 218 and digitizing marking device 220, Handwriting sample collection sub-routine 1300 may provide a digitized handwriting sample image representative of the handwriting sample data, e.g. via display 215, at execution block 1311.

Handwriting sample collection sub-routine 1300 may provide a stroke segmentation prompt, e.g. via display 215, at execution block 1312.

Handwriting sample collection sub-routine 1300 may capture stroke segmentation points, e.g. via user input 213, at execution block 1313.

Handwriting sample collection sub-routine 1300 may map any captured stroke segmentation points to points in the digitized handwriting sample data at execution block 1314.

At decision block 1315, if the stroke segmentation process is complete, handwriting sample collection sub-routine 1300 may proceed to starting loop block 1318, described below in reference to FIG. 13B); otherwise handwriting sample collection sub-routine 1300 may continue to wait for the stroke segmentation process to complete.

Referring now to FIG. 13B, at starting loop block 1316, handwriting sample collection sub-routine 1300 may process each code point sample in the handwriting sample text in turn.

Handwriting sample collection sub-routine 1300 may provide a stroke identification prompt at execution block 1318, e.g. via display 215.

At decision block 1320, if a stroke identification response is obtained, e.g. via user input 213, handwriting sample collection sub-routine 1300 may proceed to execution block 1323; otherwise handwriting sample collection sub-routine 1300 may continue to wait for a stroke identification response.

Handwriting sample collection sub-routine 1300 may instantiate a new code point sample value for the current code point of the handwriting sample text in the handwriting code-point set data structure at execution block 1323.

At decision block 1325, if multiple stroke segments were identified for the current code point during stroke identification, then handwriting sample collection sub-routine 1300 may proceed to starting loop block 1328; otherwise handwriting sample collection sub-routine 1300 may proceed to execution block 1338.

At starting loop block 1328, handwriting sample collection sub-routine 1300 may process each identified stroke segment in turn.

Handwriting sample collection sub-routine 1300 may instantiate a new segment value for the current sample value in the handwriting code point data structure at execution block 1330.

Handwriting sample collection sub-routine 1300 may identify digitized handwriting sample data corresponding to the current stroke segment at execution block 1331.

Handwriting sample collection sub-routine 1300 may associate the identified digitized handwriting sample data with the new segment value for the current code point at execution block 1333.

At ending loop block 1335, handwriting sample collection sub-routine 1300 may loop back to starting loop block 1328 to process the next identified stroke segment, if any.

At execution block 1338, handwriting sample collection sub-routine 1300 may identify digitized handwriting sample data corresponding to the identified stroke.

Handwriting sample collection sub-routine 1300 may associate the identified digitized handwriting sample data with the new code point sample value for the current code point at execution block 1340.

At ending loop block 1343, handwriting sample collection sub-routine 1300 may loop back to starting loop block 1316 to process the next code point in the handwriting sample text, if any.

At termination block 1398 (see FIG. 13A), handwriting sample collection sub-routine 1300 may return a collection successful message at termination block 1399.

Handwriting sample collection sub-routine 1300 may return a collection successful message at termination block 1399.

Exemplary Network Topology of a Client/Server-Based Handwriting Generation System FIG. 14 illustrates a first exemplary client/server-based handwriting generation system 1400 in accordance with various embodiments. Client devices 200C-D, front-end server 300A, and a handwriting generation server 300C are in data communication with a network 103. In various embodiments, network 103 may include the Internet, one or more local area networks ("LANs"), one or more wide area networks ("WANs"), cellular data networks, and/or other data networks. Network 103 may, at various points, be a wired and/or wireless network. Remote front-end server 300A may be in data communication with a remote handwriting generation server 300C. Remote handwriting generation server 300C may be in data communication with handwriting sample set data store 108.

In these and other embodiments, client devices 200C-D may be networked computing devices having form factors including general purpose computers (including "desktop," "laptop," "notebook," "tablet" computers, or the like); mobile phones; watches, glasses, or other wearable computing devices; or the like. Memory 205 of client devices 200C-D may store program code, executable by central processing unit 203, corresponding to an operating system 223, as well as program code corresponding to various software applications, such as a browser application 225, a handwriting generation application 233, and other applications (not shown), such as a handwriting generation application capable of performing the functionality described below.

For simplified exemplary purposes, two client devices 200 are shown, client device 200C is depicted as a laptop computer and client device 200D is depicted as a mobile phone. In various embodiments there may be many more client devices 200. The primary functional components of an exemplary, form-factor-independent client device 200 are described above in reference to FIG. 2. Client devices 200C-D may be the same physical devices as some or all of client devices 200A-B. Client device 200C may be in data communication with an external printing device 1408.

In various embodiments, remote handwriting generation server 300C may be networked computing devices generally capable of accepting requests over network 108, e.g. from client devices 200, each other, various databases, and/or other networked computing devices, and providing responses according to a handwriting generating service 323C capable of performing the functionality described below. The primary functional components of an exemplary handwriting ingestion server 300C, are described above in reference to FIG. 3.

Client/Server-Based Handwriting Generation Service

Referring collectively to FIGS. 1-14, and as is described in more detail below, an instance of client handwriting generation application 233 operating on a client device, such as client devices 200C-D, remote user session management service 323A operating on front-end server 300A, and remote handwriting generation service 323C operating on handwriting ingestion server 300C (collectively a client/server-based handwriting generation system) in accordance with the present embodiments may operate to utilize a code-point sample data set of a user's handwriting, described above, to obtain text data including a message from a user and generate an simulated text image, e.g. for electronic display and/or hard-copy printing, including a sequence of glyphs corresponding the message and having the appearance of being rendered in the user's handwriting. Such a client/server based handwriting generation system may be operated in furtherance of a handwriting digitization service provider (not shown) providing handwriting reproduction services.

Instantiations of client handwriting generation application 233 may act as an interface between a user of client devices 200C-D and user session management service 323A operating on front-end server 300A. Upon instantiation, client handwriting generation application 233 may send a "create new session" request to user session management service 323A, for example including identifying information for client device 200, identifying information for the particular instantiation of client handwriting generation application 233, and/or user-account credentials such as a user name and password, obtained from the user or stored in memory 205. If presented, the user-account credentials may be associated with an existing user account or with a generic, temporary, and/or anonymous "guest" account.

User session management service 323A may create a corresponding user session (not shown) associated with the particular instantiation of client handwriting ingestion generation 233, identified by a user-session identifier (referred to herein as a "session ID") and may obtain user account information, such as a user identifier, associated with the provided identifying information from administrative data store 105 and provide a response to client handwriting ingestion application 228, which may include information related to features and services provided by the handwriting digitization service provider which the user-account associated with the user-account credentials are authorized to access.

Referring also now to FIGS. 15A-D, client handwriting generation application 233 may then present the user with a handwriting generation input prompt 1503, e.g. via optional display 215, and wait for the user to indicate a selection of a specific option, e.g. via optional input 213. Such options may include providing manual text input 1505A or selecting a pre-existing file including text data 1505B, and the like. Upon obtaining a selection of one of the presented options, e.g. via user input 213, client handwriting generation application 233 may process the selection and generate a request corresponding to the selected option.

These requests may be provided to user session management service 323A operating on front-end server 300A, e.g. via network 103. User session management service 323A may process the requests, provide related internal requests to handwriting generation service 323C, obtain responses from handwriting generation service 323C, provide responses to client handwriting generation application 233 and store records of these requests and responses and other related data, e.g. in administrative data store 105 indexed by a user identifier and/or a user session identifier.

For example, if the user selects manual input 1505A, client handwriting generation application 233 may then present the user with a text entry window 1508. Text entry window 1508 may include a text entry prompt 1510 and a text display window 1513. After a user enters text for conversion (e.g. "This is a test"), client handwriting generation 233 application may present the user with a customization interface 1515. Customization interface 1515 may include a customization prompt 1518 and one or more customization options, such as a handwriting style option 1520A (e.g. user A's formal handwriting style, user B's casual handwriting style, and the like), a writing implement option 1520B (e.g. ballpoint pen, fountain pen, calligraphy brush, spray can, and the like), and/or other options 1520C (e.g. animation, color, and the like). After a user selects options 1520, client handwriting generation application 233 may present the user with a simulated text image interface 1523 including a simulated text image 1525 corresponding to the text entered by the user, rendered in the selected handwriting style in accordance with the selected options. Simulated text interface 1523 may also provide customization options 1520A-C to enable the user to make additional changes to simulated text image 1525.

Exemplary Series of Communications

Figure 16:
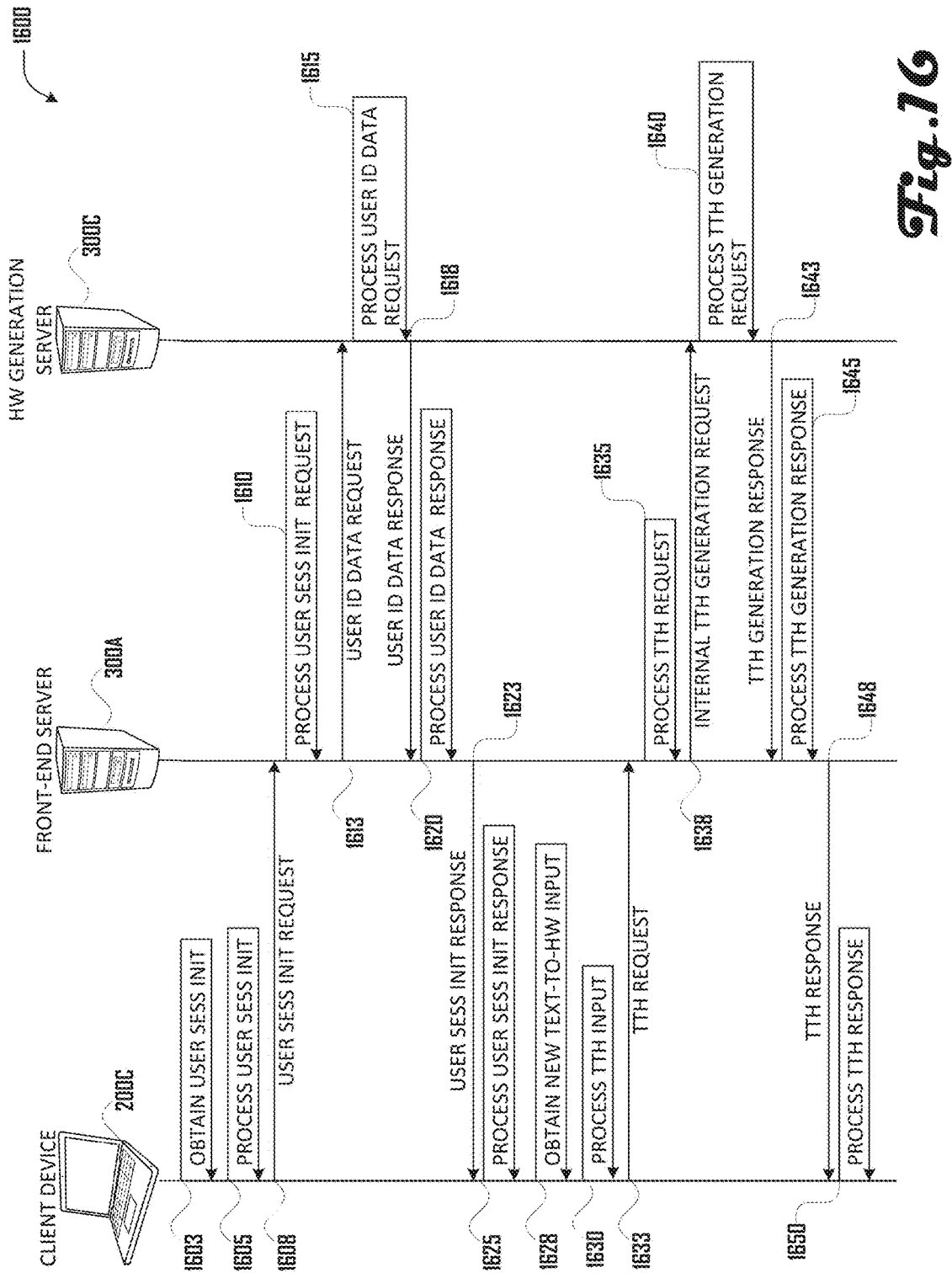
FIG. 16 illustrates a series of data communications between various components of the client/server-based handwriting generation system in accordance with various embodiments.

FIG. 16 illustrates a second exemplary series of communications 1600 between client device 200C, front-end server 300A, and handwriting generation server 300C in accordance with various embodiments of an exemplary client/server-based handwriting ingestion system, such as the exemplary client/server-based handwriting ingestion system illustrated in FIG. 14.

Client device 200C may obtain 1603 and process 1605 a user session initiation command, e.g. via user input 213 in response to a prompt provided via display 215.

Client device 200A may provide front-end server 300A with a corresponding user session initiation request 1608. User session initiation request 1608 may include user identifying information corresponding to a user of client device 200A, e.g. via an alphanumeric identifier associated with a user, and the like.

Front-end server 300A may process 1610 user session initiation request 1608. For example, front-end server 300A may instantiate a user session associated with the user identifying information, obtain additional meta-data relating to the user identifying information, e.g. from administrative data store 105 and/or other sources, and the like.

Front-end server 300A may provide handwriting generation server 300C with a user data request 1613. User data request 1613 may include data obtained from client device 200A via user session initiation request 1608, such as a user identifier, and via processing 1610 the user session initiation request by front-end server 300A.

Handwriting generation server 300C may process 1615 user data request 1613. For example, handwriting generation server 300C may obtain handwriting sample data associated with the user identifier, e.g. from handwriting sample set data store 108, determine a measure of handwriting sample set completeness, and the like.

Handwriting generation server 300C may then provide a user data response 1618 to front-end server 300A.

Front-end server 300A may then process 1620 user data response 1618, e.g. by parsing the user data response to extract data to pass on to client device 200.

Front-end server 300A may then provide a user session initiation response 1623 to client device 200A. User session initiation response 1623 may include a user session identifier, handwriting sample set data, and/or the like.

Client device 200A may then process 1625 user session initiation response 1620, for example by rendering information provided in the user session initiation response via display 215.

Client device 200A may then obtain 1628 and process 1630 new text-to-handwriting input, such as in the manner described above in reference to FIGS. 15A-C, to obtain text data for conversion.

Client device 200A may provide front-end server 300A with a corresponding text-to-handwriting ("TTH") request 1633. Text-to-handwriting request 1633 may include the user session identifier, text data, customization option data, and the like.

Front-end server 300A may process 1635 TTH request 1633 and provide handwriting generation server 300C with an internal TTH generation request 1638. Internal TTH generation request 1638 may include the user identifier associated with the may include the user session identifier, text data, and customization option data. and the like.

Handwriting generation server 300C may process 1640 internal TTH request 1638. For example, handwriting generation server 300C may invoke handwriting generation service 323C to execute instructions approximating the functionality of TTH generation routine 1800, illustrated in FIG. 18, and its associated sub-routines.

Handwriting generation server 300C may then provide an internal TTH response 1643 to front-end server 300A. For example, internal TTH response 1643 may include a simulated text image corresponding to the text data obtained by internal TTH request 1638.

Front-end server 300A may then process 1645 internal TTH response 1643 and provide a TTH response 1648 to client device 200C. TTH response 1648 may include the simulated text image corresponding to the text data obtained via internal TTH response 1643.

Client device 200C may then process 1650 TTH response 1648, for example by rendering information provided in the handwriting sample update response via display 215, as described above with respect to FIG. 15D, and the like.

Exemplary Sample Text Intake Routine

Figure 17:
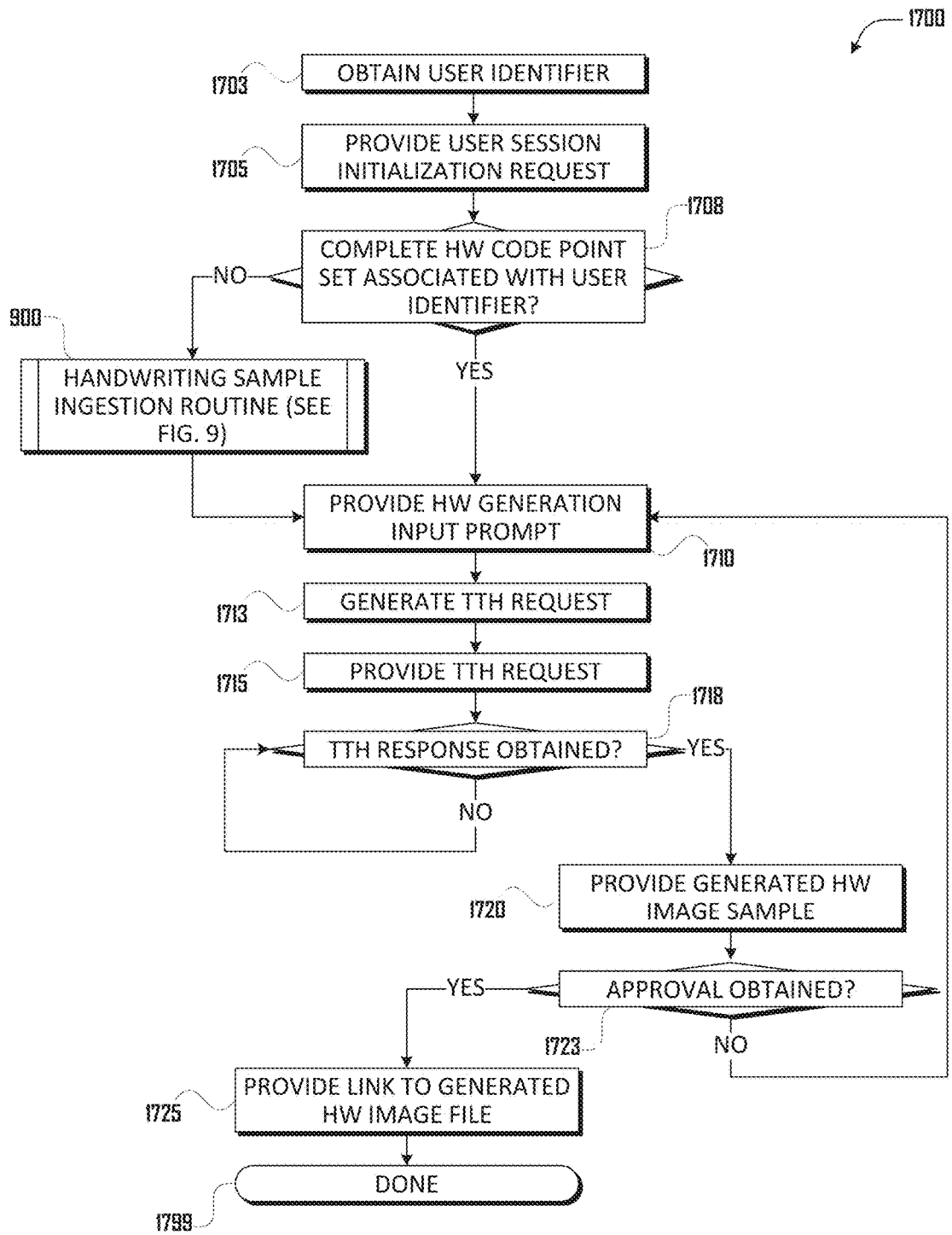
FIG. 17 illustrates a functional block diagram of a sample text intake routine which may be implemented by a client device of the client/server-based handwriting ingestion system in accordance with various embodiments.

FIG. 17 illustrates an exemplary sample text intake routine 1700, which may be implemented by client handwriting generation application 228 operating on a client device, such as client devices 200C-D.

Routine 1700 may obtain a user identifier at execution block 1703.

Routine 1700 may provide a user session initialization request at execution block 1705, e.g. to front-end server 300A. The user session initialization request may include the user identifier obtained in execution block 1703.

At decision block 1708, if a complete handwriting code point set is associated with said user identifier, routine 1700 may proceed to execution block 1710; otherwise, routine 1700 may call handwriting sample ingestion routine 900, described above in reference to FIG. 9.

Routine 1700 may provide a handwriting generation prompt, for example as described above in reference to FIG. 15A, at execution block 1710.

Routine 1700 may parse handwriting generation input data, e.g. text data, to generate a text-to-handwriting request at execution block 1713.

Routine 1700 may provide the text-to-handwriting request, e.g. to front-end sever 300A as described above in reference to FIG. 16, at execution block 1715. The text-to-handwriting request may include a user session identifier, text data, customization option data, and the like.

At decision block 1718, if a text-to-handwriting response has been obtained, then routine 1700 may proceed to execution block 1720; otherwise routine 1700 may continue to wait for a text-to-handwriting response. The text-to-handwriting response may include a generated handwriting image sample and/or a URI that points to a generated handwriting image sample.

Routine 1700 may render a generated handwriting image sample, such as described above in reference to FIG. 15D, at execution block 1720.

At decision block 1723, if routine 1700 obtains approval of the generated handwriting image sample, e.g. via user input 213, routine 1700 may proceed to execution block 1725

Routine 1700 may provide a link to a file corresponding to the generated handwriting image sample at execution block 1725. The file may be stored locally on client device 200C or remotely, e.g. on administrative data store 105 or the like.

Routine 1700 may terminate at termination block 1799.

Exemplary Text-to-Handwriting Generation Routine

Figure 18:
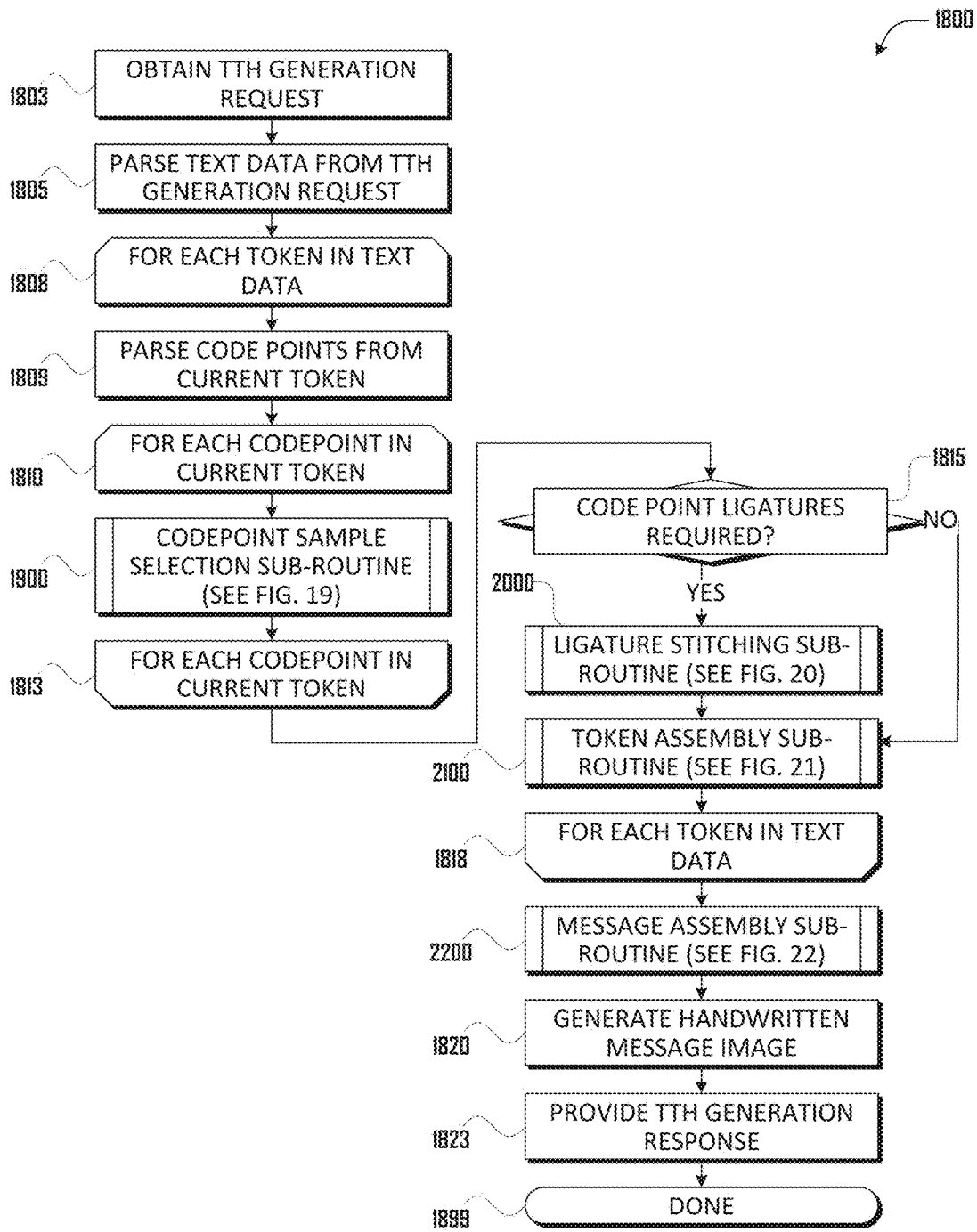
FIG. 18 illustrates a functional block diagram of a text-to-handwriting routine which may be implemented by a handwriting generation server of the client/server-based handwriting generation system in accordance with various embodiments.

FIG. 18 illustrates an exemplary sample text intake routine 1800, which may be implemented by handwriting generation service 323C operating on handwriting generation server 300C, for example during the processing of a text-to-handwriting generation request 1640, described above.

Routine 1800 may obtain a text-to-handwriting ("TTH") generation request, including text data as described above, and instantiate a TTH data structure at execution block 1803.

Routine 1800 may parse the text data obtained in the TTH request at execution block 1803. For example, if the text data corresponds to English language text, such as "This is a test," then routine 1800 may separate the text data into four tokens, each token corresponding to each word ("This," "is," "a," and "test"), and instantiate a token identifier corresponding to each of tokens in the TTH data structure.

At starting loop block 1808, routine 1800 may process each token in the message data in turn.

Routine 1800 may parse the code points of the current token at execution block 1809. For example, if the current token corresponds to the word "test," then routine 1800 may separate the token into four code points ("t," "e," "s," and "t") and instantiate a code point identifier corresponding to each of the code points in the token.

At starting loop block 1810, routine 1800 may process each code point in the current token in turn.

Routine 1800 may call code point sample selection sub-routine 1900, described below in reference to FIG. 19.

At ending loop block 1813, routine 1800 may loop back to starting loop block 1810 and process the next code point in the current token, if any.

At decision block 1815, if intra-code point ligatures are required for the current token (e.g. in the case of cursive English language handwriting), then routine 1800 may call ligature stitching sub-routine 2000, described below in reference to FIGS. 20A-B; otherwise, routine 800 may call token assembly sub-routine 2100, described below in reference to FIG. 21.

At ending loop block 1818, routine 1800 may loop back to starting loop block 1808 and process the next token in the text data, if any.

Routine 1800 may call message assembly sub-routine, described below in reference to FIG. 22.

Routine 1800 may then generate a handwritten message image using the data in the TTH data structure at execution block 1820.

Routine 1800 may provide a TTH response, described above, at execution block 1823.

Routine 1800 may terminate at termination block 1899.

Exemplary Code Point Sample Selection Sub-Routine

Figure 19:
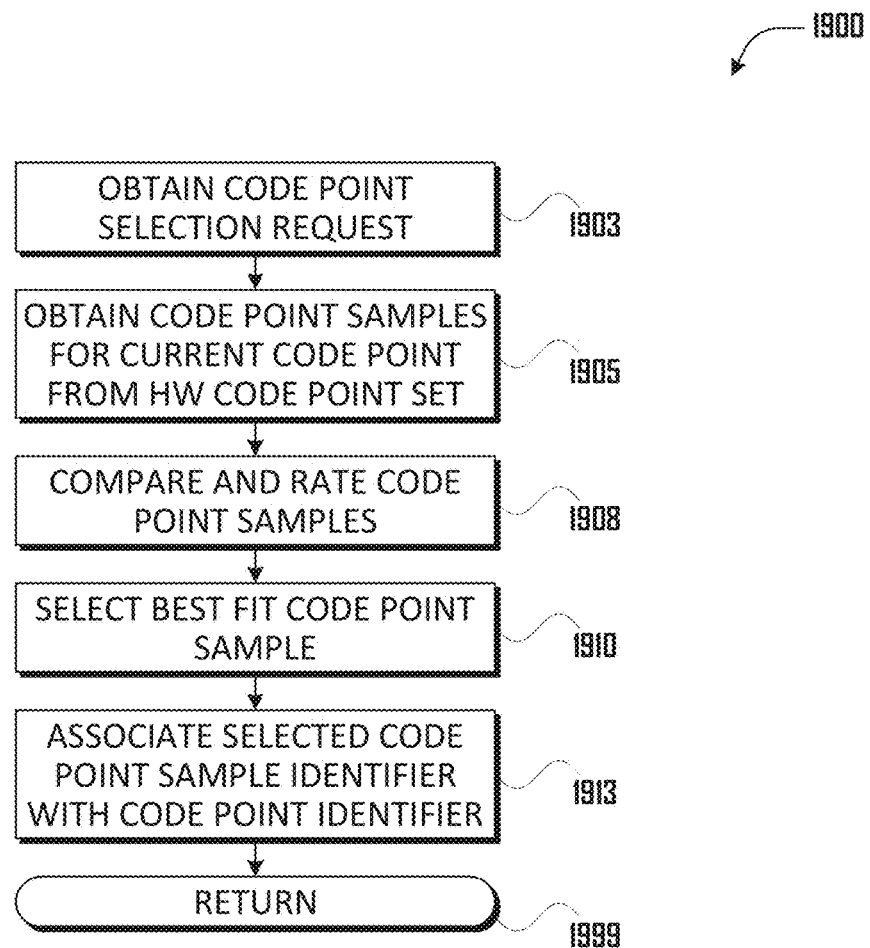
FIG. 19 illustrates a functional block diagram of a code-point sample selection sub-routine which may be implemented by a handwriting generation server of the client/server-based handwriting generation system in accordance with various embodiments.

FIG. 19 illustrates an exemplary code point sample selection sub-routine 1900 which may be implemented by handwriting generation service 323C operating on handwriting generation server 300C, for example in response to a call from TTH generation routine 1800.

Sub-routine 1900 may obtain a code point selection request at execution block 1903. For example, code point selection request may include a TTH data structure identifier and a code point identifier.

Sub-routine 1900 may obtain code point samples corresponding to the code point identifier from a handwriting code point set associated with the TTH data structure.

Sub-routine 1900 may compare the obtained code point samples at execution block 1908. For example, sub-routine 1900 may rate each code point samples suitability for the current code point identifier based on one or more criteria. Each code point sample may also be assigned an additional, randomized rating.

Sub-routine 1900 may select the best fit code point sample based on the code point sample ratings, including the randomized rating, if available, at execution block 1910.

Sub-routine 1900 may associate the selected code point sample identifier from the handwriting code point set with the code point identifier of the TTH data structure at execution block 1913.

Sub-routine 1900 may return to TTH generation routine 1800 at 1999.

Exemplary Ligature Stitching Sub-Routine

Figure 20A:
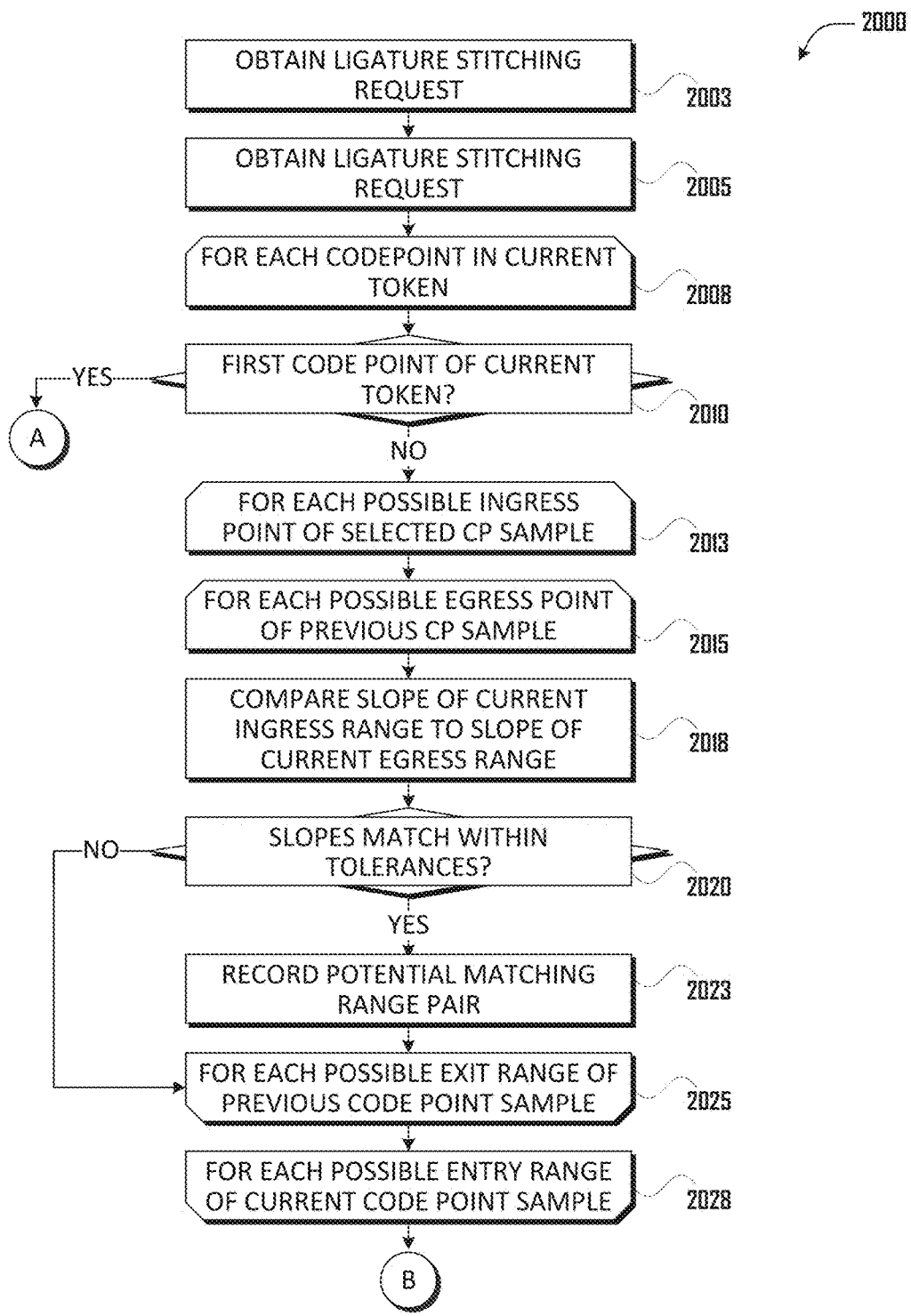
FIGS. 20A-B illustrate a functional block diagram of a ligature stitching sub-routine which may be implemented by a handwriting generation server of the client/server-based handwriting generation system in accordance with various embodiments.
Figure 20B:
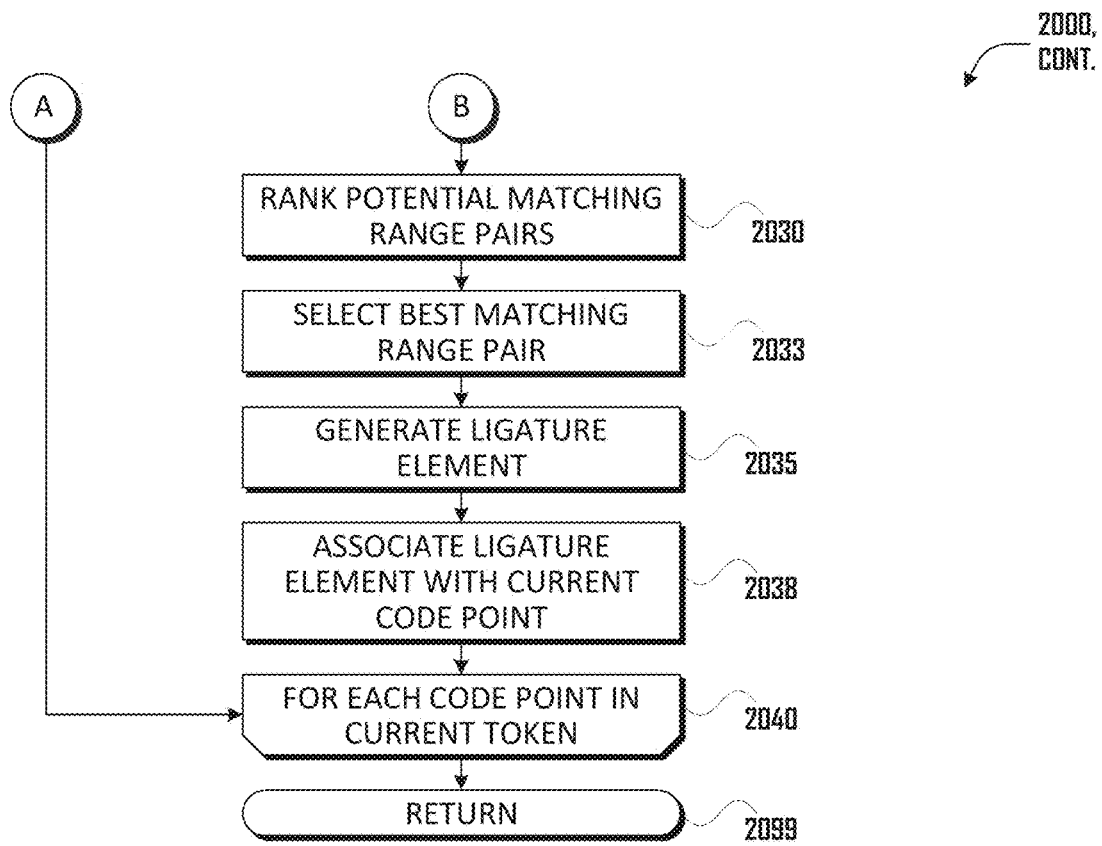

FIGS. 20A-B illustrate an exemplary ligature stitching sub-routine 2000 which may be implemented by handwriting generation service 323C operating on handwriting generation server 300C, for example in response to a call from TTH generation routine 1800.

Referring to FIG. 20A, sub-routine 2000 may at execution block 2003.

Sub-routine 2000 may at execution block 2005.

At starting loop block 2008, sub-routine 2000 may process each code point of the current token in turn.

At decision block 2010, if the current code point is the first code point of the current token, then sub-routine 2000 may proceed to ending loop block 2040 (FIG. 20B); otherwise sub-routine 2000 may proceed to starting loop block 2013.

At starting loop block 2013, sub-routine 2000 may process each possible ingress point of the current code point in turn.

At starting loop block 2015, sub-routine 2000 may process each possible egress point of the previously processed code point in turn.

Sub-routine 2000 may at execution block 2018.

At decision block 2020, if the slope of the current ingress point matches the slope of the current egress point within a pre-defined tolerance range, then sub-routine 2000 may proceed to execution block 2023; otherwise sub-routine 2000 may proceed to ending loop block 2025.

Sub-routine 2000 may record the current ingress point and egress point as a potential matching range pair at execution block 2023.

At ending loop block 2025, sub-routine 2000 may loop back to starting loop block 2015 to process the next possible egress point of the previously processed code point, if any.

At ending loop block 2028, sub-routine 2000 may loop back to starting loop block 2013 to process the next possible ingress point of the current code point, if any.

Referring now to FIG. 20B, sub-routine 2000 may rank the potential matching range pairs at execution block 2030. For example, the matching range pairs may be ranked based on the difference in magnitude between the respective egress angle and ingress angle.

Sub-routine 2000 may select the best matching range pair based on the rankings at execution block 2033.

Sub-routine 2000 may generate a ligature element based on the matching range pair at execution block 2035.

Sub-routine 2000 may associate the ligature element with the current code point at execution block 2038.

At ending loop block 2040, sub-routine 2000 may process the next code point of the current token, if any.

Sub-routine 2000 may return to TTH generation routine 1800 at return block 2099.

Exemplary Token Assembly Sub-Routine

Figure 21:
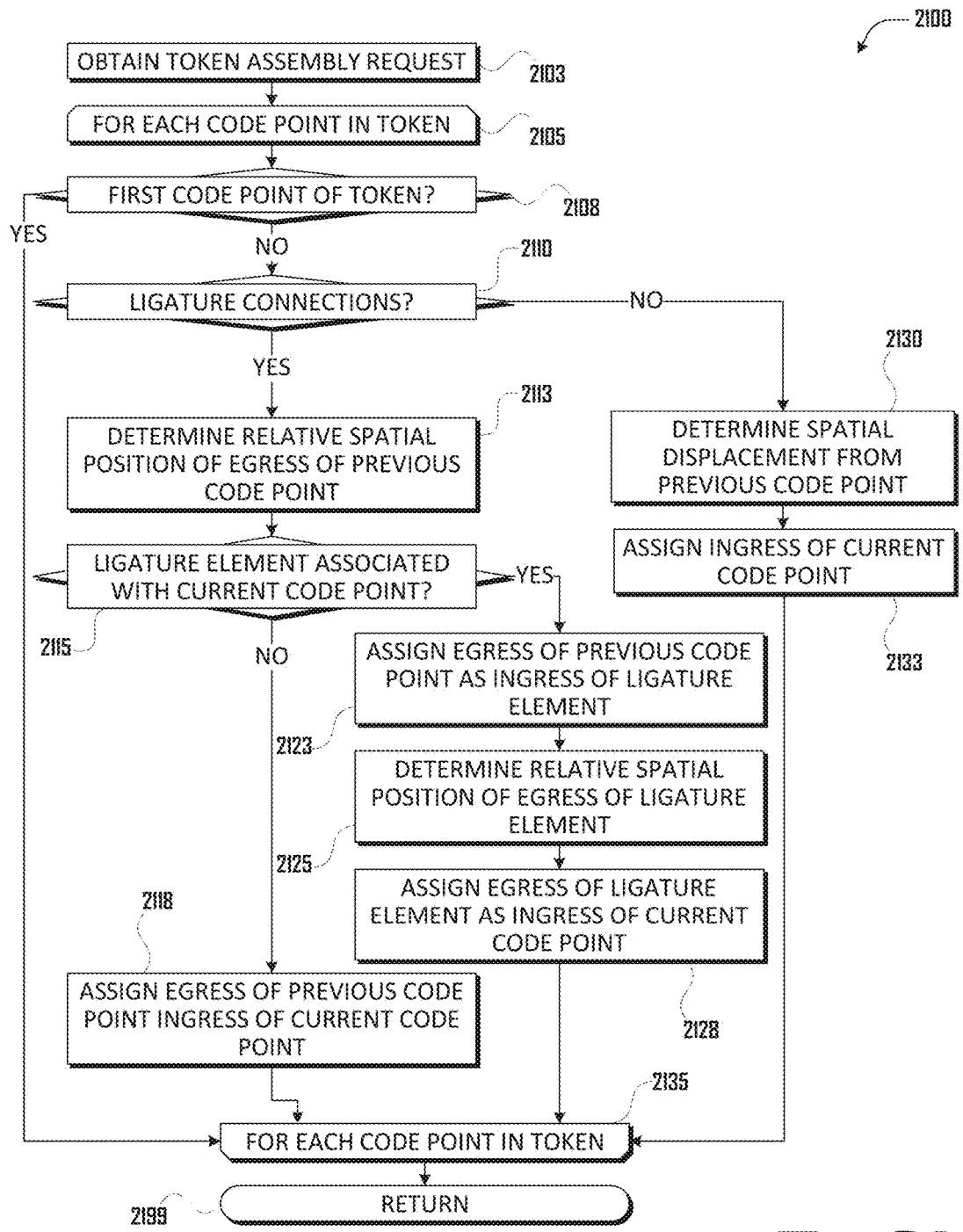
FIG. 21 illustrates a functional block diagram of a token assembly sub-routine which may be implemented by a handwriting generation server of the client/server-based handwriting generation system in accordance with various embodiments.

FIG. 21 illustrates an exemplary token assembly sub-routine 2100 which may be implemented by handwriting generation service 323C operating on handwriting generation server 300C, for example in response to a call from TTH generation routine 1800. Token assembly sub-routine 2100 may function to assemble the code points of a given token in a manner that will simulate the handwriting associated with a specific user identifier.

Sub-routine 2100 may obtain a token assembly request at execution block 2103. For example, the token assembly request may include a token identifier from the current TTH data structure.

At starting loop block 2105, sub-routine 2100 may process each code point of the token in turn.

At decision block 2108, if the current code point is the first code point of the token, then sub-routine 2100 may proceed to decision ending loop block 2135, described below; otherwise, sub-routine 2100 may proceed to decision block 2110.

At decision block 2110, if the code points of the current TTH data structure are to be linked by ligatures, sub-routine 2100 may proceed to 2113; otherwise, sub-routine 2100 may proceed to execution block 2130, described below.

Sub-routine 2100 may determine a relative spatial position of an egress point of the previously processed code point at execution block 2113.

At decision block 2115, if a ligature element is associated with the current code point identifier, then sub-routine 2100 may proceed to execution block 2123, described below; otherwise sub-routine 2100 may proceed to execution block 2118.

Sub-routine 2100 may assign the relative spatial position of the egress point of the previously processed code point as the ingress point of the current code point at execution block 2118. Sub-routine 2100 may then proceed to ending loop block 2135, described below.

At execution block 2123, sub-routine 2100 may assign the relative spatial position of the egress point of the previously processed code point as the ingress point of the ligature element associated with the current code point at execution block 2118.

Sub-routine 2100 may determine a relative spatial position of an egress point of the ligature element associated with the current code point at execution block 2125.

Sub-routine 2100 may assign the relative spatial position of the egress point of the ligature element associated with the current code point as the ingress point of the current code point at execution block 2128. Sub-routine 2100 may the proceed to ending loop block 2135, described below.

At execution block 2130, sub-routine 2100 may determine a spatial displacement for the current code point relative to the previous code point.

Sub-routine 2100 may assign an ingress point for the current code point based on the spatial displacement at execution block 2133.

At ending loop block 2135, sub-routine 2100 may loop back to starting loop block 2105 to process the next code point in the token, if any.

Sub-routine 2100 may return to TTH generation routine 1800 at return block 2199.

Exemplary Message Assembly Sub-Routine

Figure 22:
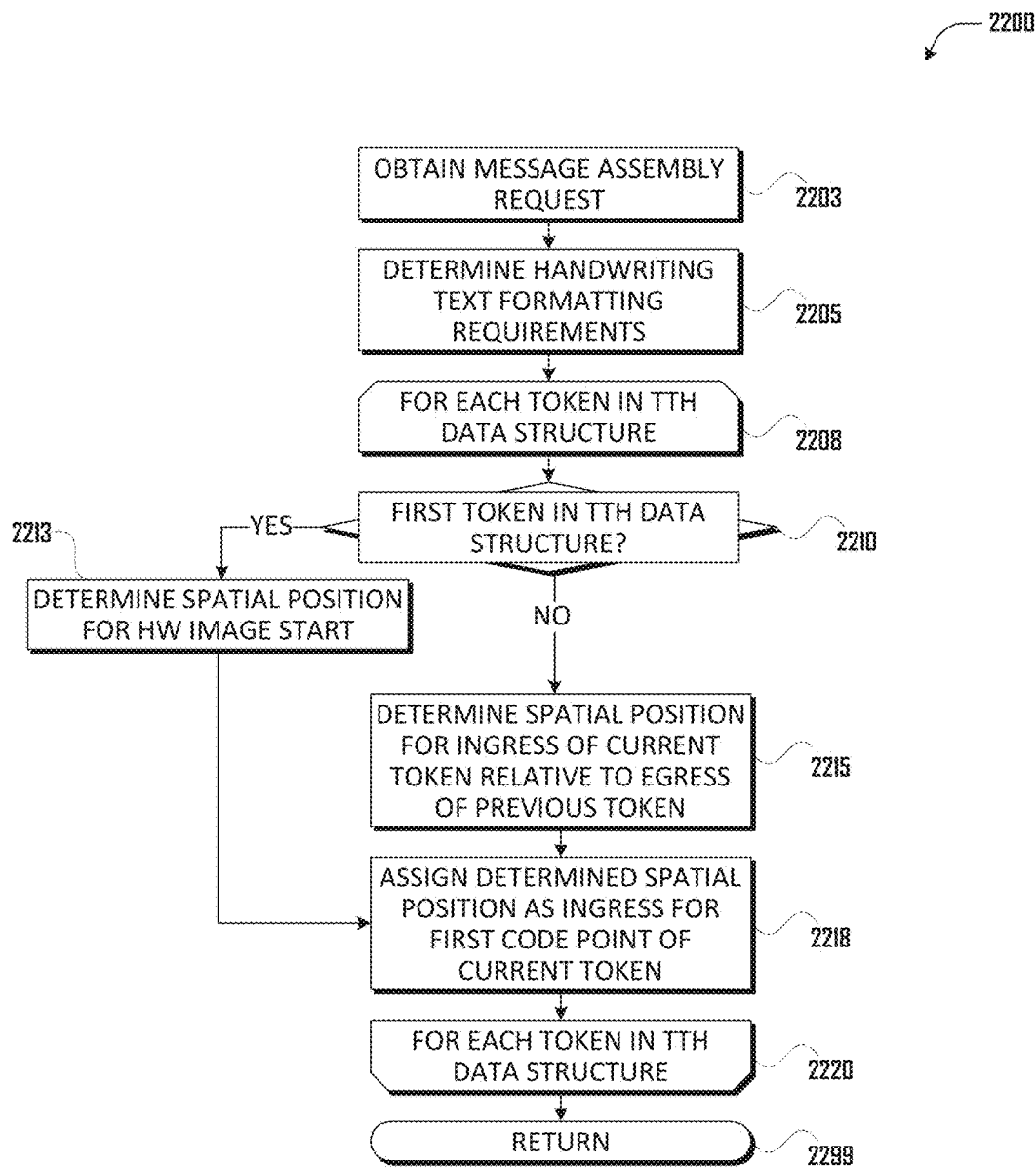
FIG. 22 illustrates a functional block diagram of a token assembly sub-routine which may be implemented by a handwriting generation server of the client/server-based handwriting generation system in accordance with various embodiments.

FIG. 22 illustrates an exemplary message assembly sub-routine 2200 which may be implemented by handwriting generation service 323C operating on handwriting generation server 300C, for example in response to a call from TTH generation routine 1800. Message assembly sub-routine 2100 may function to assemble the tokens of a TTH data structure in a manner that will simulate the handwriting associated with a specific user identifier.

Sub-routine 2200 may obtain a message assembly request at execution block 2203. The message assembly request may identify a TTH data structure.

Sub-routine 2200 may determine various handwriting text formatting requirements at execution block 2205. For example, sub-routine 2200 may determine a maximum code point height for the handwriting text.

At starting loop block 2208, sub-routine 2200 may process each token in the TTH data structure in turn.

At decision block 2210, if the current token is the first token in the TTH data structure, then sub-routine 2200 may proceed to execution block 2213; otherwise sub-routine 2200 may proceed to execution block 2215, described below.

At execution block 2213, sub-routine 2200 may determine a starting spatial position for the first token in the handwriting image. Sub-routine 2200 may then proceed to execution block 2218.

Sub-routine 2200 may determine a spatial position of the ingress point of the current token relative to an egress point of the previous token at execution block 2218.

Sub-routine 2200 may assign the determined spatial position as the ingress point for the first code point of the current token at execution block 2218.

At ending loop block 2220, sub-routine 2200 may loop back to starting loop block 2208 to process the next token in the TTH data structure, if any.

Sub-routine 2200 may return to TTH generation routine 1800 at return block 2299.

CONCLUSION

Although specific embodiments have been illustrated and described herein, a variety of alternate and/or equivalent implementations may be substituted for the specific embodiments shown and described without departing from the scope of the present disclosure. This application is intended to cover any adaptations or variations of the embodiments discussed herein.

Certain aspects of the present methods and systems may focus on computer implemented methods of obtaining digitized hand-writing data corresponding to a sample of a needed code point of a set of code points. Such methods may include: obtaining a sample of digitized handwritten text, the sample of digitized handwritten text including glyph data corresponding to a first glyph, the first glyph corresponding to the needed code point of the set of code points; associating the first glyph with the needed code point; identifying stroke data in the glyph data, the stroke data corresponding to a stroke component of the first glyph, determining a plurality of dimensional values of the stroke component in the stroke data; and associating the plurality of dimensional values with a new code point sample of the needed code point in a code point set data structure.

Other, not-mutually exclusive, aspects of the present methods and systems may focus on computer implemented methods of supplementing an incomplete handwriting code point data structure corresponding to a set of code points. Such methods may include: identifying a plurality of code points from the set of code points, the plurality of code points corresponding to code points in need of dimensional values for at least one code point sample; selecting a preferred handwriting sample phrase from a plurality of predefined handwriting sample phrases, the preferred handwriting sample phrase including at least a first code point of the plurality of code points; obtaining a sample of digitized handwritten text corresponding to the preferred handwriting sample phrase, the sample of digitized handwritten text including glyph data corresponding to a first glyph, the first glyph corresponding to the first code point; associating the first glyph with the first code point; identifying stroke data in the glyph data, the stroke data corresponding to a stroke component of the first glyph, determining a plurality of dimensional values of the stroke component in the stroke data; and associating the plurality of dimensional values with a new code point sample of the needed code point in the code point set data structure.

Other, not-mutually exclusive, aspects of the present methods and systems may focus on computer implemented methods of generating digitized hand-writing data corresponding to an ordered plurality of tokens including a first token, each token of the ordered plurality of tokens corresponding to an ordered plurality of code points. Such methods may include selecting a sequential sub-set of two code points from the ordered plurality of code points corresponding to the first token; selecting a first code point sample corresponding to a first code point of the sequential sub-set of two code points, the first code point sample including a plurality of dimensional values associated with the first code point; selecting a second code point sample corresponding to a second code point of the sequential sub-set of two code points, the second code point sample including a plurality of dimensional values associated with the second code point; and generating image data corresponding to a glyph representation of the ordered plurality of tokens including the first code point sample and the second code point sample using the plurality of dimensional values associated with the first code point and the plurality of dimensional values associated with the second code point.

What is claimed is:

1. A handwriting image generation system useful in generating a simulated text image, the handwriting image generation system comprising:
    a handwriting sample set data store storing data corresponding to a plurality of code point sample data structures, and each code point sample data structure including an associated time-based series of sampled stroke dimensional values;
    a computer processing unit in data communication with a display and said handwriting sample set data store;
    memory in data communication with said computer processing unit and containing executable instructions for causing said computer processing unit to access a handwriting image sample resulting from an intake method including the steps of:
        initiating, at a client device, handwriting sample ingestion signaling a set identifier not being associated with a complete handwriting code point set;
        providing, at the client device, a handwriting generation prompt;
        transmitting, from the client device, a text-to-handwriting (TTH) request in response to handwriting generation input data;
        receiving, at the client device, a TTH response;
        rendering, at the client device, a machine-generated handwriting image sample based on said TTH response; and providing a link to a file corresponding to said machine-generated handwriting image sample based on said TTH response as a conditional response to user input signifying approval of said machine-generated handwriting image sample based on said TTH response;

memory in data communication with said computer processing unit and containing executable instructions for causing said computer processing unit to perform a structure-selection method of generating digitized hand-writing data corresponding to an ordered plurality of tokens, said ordered plurality of tokens including a first token, each token of the ordered plurality of tokens corresponding to an ordered plurality of code points, the structure-selection method including the steps of:

(a) selecting a sequential sub-set of two code points from the ordered plurality of code points corresponding to the first token;

(b) selecting a first code point sample data structure from said handwriting sample set data store, said first code point sample data structure corresponding to a first code point of said sequential sub-set of two code points, said first code point sample data structure including a first time-based series of sampled stroke dimensional values, by:

(b-1) identifying a plurality of candidate code point sample data structures corresponding to said first code point;

(b-2) generating a plurality of ratings for each of said plurality of candidate code point sample data structures based on a respective plurality of handwriting criteria (b-3) generating a randomized rating for each of said plurality of candidate code point sample data structures; and (b-4) selecting a code point sample data structure of said plurality of candidate code point sample structures as said first code point sample data structure based on said generated ratings of each of said plurality of candidate code point samples, including said randomized rating;

(c) selecting a second code point sample data structure from said handwriting sample set data store, said second code point sample data structure corresponding to a second code point of said sequential sub-set of two code points, said second code point sample data structure including a second time-based series of sampled stroke dimensional values; and (d) generating digitized handwriting data corresponding to a glyph representation of said ordered plurality of tokens, said digitized handwriting data including a representation of said first code point and a representation of said second code point, said representation of said first code point being generated using said plurality of dimensional values associated with said first code point and said representation of said second code point being generated using said plurality of dimensional values associated with said second code point, wherein at least one sample of said plurality of candidate code point sample data structures indicates both a source of said at least one sample and a relative position within said source of said at least one sample; and memory in data communication with said computer processing unit and containing executable instructions for causing said computer processing unit to perform a message generation method of generating a handwritten message image, the message generation method including the steps of:

obtaining said TTH request via the intake method at a server;

instantiating a TTH data structure;

parsing text data obtained in said TTH request;

processing each token in the text data by repeatedly invoking the structure-selection method and by repeatedly processing each code point in a current token;

generating image data including a simulated handwritten text image using the text data in said TTH data structure after assembling each token into said TTH data structure by calling a text assembly sub-routine; and transmitting from the server, in response to said TTH request, the image data including said simulated handwritten text image generated using said text data in said TTH data structure after assembling each token into said TTH data structure by calling said text assembly sub-routine.

2. The handwriting image generation system of claim 1, wherein said plurality of dimensional values associated with said first code point and said plurality of dimensional values associate with said second code point include a plurality of time values, a plurality of horizontal displacement values, a plurality of vertical displacement values, a plurality of rotational displacement values, a plurality of angular displacement values, and a plurality of pressure values.

3. The handwriting image generation system of claim 1, wherein the handwriting image generation system is further configured to determine said first code point and said second code point should be joined by a ligature; step (c) includes:

(c-1) comparing a first slope value, said first slope value being associated with a potential egress point of said first code point sample, and a second slope value, said second slope value being associated with a potential ingress point of said second code point sample, (c-2) determining said first slope value and said second slope value match within a predefined tolerance level, and (c-3) generating ligature data for connecting said potential egress point of said first code point sample and said ingress point of said second code point sample; and wherein said representation of said first code point includes a representation of said potential egress point, said representation of said second code point includes a representation of said potential egress point, and said generated digitized handwriting data also includes a ligature element joining said representation of said first code point at said egress point to said representation of said second codepoint at said ingress point.

4. The handwriting image generation system of claim 1, wherein the ordered plurality of tokens includes a second token and the handwriting image generation system is further configured to determine a spatial displacement value between a final code point of said first token and an initial code point of said second token and step (d) includes generating said image data using said spatial displacement value to separate said final code point of said first token and said initial code point of said second token.

5. The handwriting image generation system of claim 1, wherein the handwriting image generation system is further configured to provide said image data in an image file to a remote device.

6. The handwriting image generation system of claim 1, wherein the handwriting image generation system is further configured to store said image data as an image file and provide a uniform resource identifier corresponding to said image file.

7. The handwriting image generation system of claim 1, further comprising a printer and wherein said method further includes rendering said generated image data via said printer.

8. The handwriting image generation system of claim 1, wherein the handwriting image generation system is further configured to obtain a writing implement selection and step (d) includes generating said image data in accordance with a style associated with said writing implement selection.

9. The handwriting image generation system of claim 1, wherein the handwriting image generation system is further configured to generate and render an animation corresponding to said image data.

10. The handwriting image generation system of claim 1, wherein said message generation method further includes rendering said generated image data via said display.

11. The handwriting data ingestion system of claim 1, wherein said memory in data communication with said computer processing unit and containing said executable instructions for causing said computer processing unit to perform said message generation method is configured to cause said computer processing unit to transmit, in response to a user session identifier, the image data including said simulated handwritten text image generated using said text data in said TTH data structure after assembling each token into said TTH data structure by calling said text assembly sub-routine, wherein said TTH request includes said user session identifier.

12. The handwriting data ingestion system of claim 1, wherein said memory in data communication with said computer processing unit and containing said executable instructions for causing said computer processing unit to perform said message generation method is configured to cause said computer processing unit to transmit, in response to customization option data, the image data including said simulated handwritten text image generated using said text data in said TTH data structure after assembling each token into said TTH data structure by calling said text assembly sub-routine, wherein said TTH request includes said customization option data.

* * * * *